United States Patent
Pagan et al.

(10) Patent No.: US 8,613,053 B2
(45) Date of Patent: *Dec. 17, 2013

(54) SYSTEM AND METHOD FOR AUTHORIZING A PORTABLE COMMUNICATION DEVICE

(75) Inventors: Florence C. I. Pagan, Los Angeles, CA (US); Joel E. Short, Los Angeles, CA (US)

(73) Assignee: Nomadix, Inc., Agoura Hills, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/271,099

(22) Filed: Oct. 11, 2011

(65) Prior Publication Data
US 2012/0030737 A1   Feb. 2, 2012

Related U.S. Application Data

(63) Continuation of application No. 09/458,602, filed on Dec. 8, 1999.

(60) Provisional application No. 60/111,497, filed on Dec. 8, 1998.

(51) Int. Cl.
G06F 7/04   (2006.01)

(52) U.S. Cl.
USPC ............................................. 726/4; 713/153

(58) Field of Classification Search
USPC .............. 726/7, 26, 27, 4, 5, 8; 713/153, 154, 713/155, 168; 709/225, 226, 228
See application file for complete search history.

(56) References Cited

U.S. PATENT DOCUMENTS

| | | | |
|---|---|---|---|
| 4,026,642 A | 5/1977 | Tanaka et al. | |
| 4,233,661 A | 11/1980 | Bolton et al. | |
| 4,509,277 A | 4/1985 | Bolton | |

(Continued)

FOREIGN PATENT DOCUMENTS

| AU | 2003255101 | 3/2004 |
|---|---|---|
| AU | 2006207853 | 11/2007 |

(Continued)

OTHER PUBLICATIONS

Case No. 09-CV-8441 DDP (VBKx), *Nomadix, Inc.* v. *Hewlett-Packard Co. et al.*, Defendants' Supplemental Invalidity Contentions Regarding the Prior Art Work of Mr. Ko Ikudome, dated Nov. 4, 2011, 21 pages including Exhibits I1-I3.

(Continued)

*Primary Examiner* — Beemnet Dada
(74) *Attorney, Agent, or Firm* — Knobbe Martens Olson & Bear LLP

(57) ABSTRACT

Systems and methods of authorizing a portable communication device to access a network resource. In an embodiment, a request to access a network resource is received from a portable communication device via a network. A processor is used to dynamically and selectively determine whether the portable communication device is authorized to access the requested network resource. The determination may be based on a unique identifying attribute associated with the portable communication device without the unique identifying attribute being predefined in a user profile database and without querying the portable communication device or its user for information. If the portable communication device is authorized, it may be allowed to access the network resource. Otherwise, it may be redirected to an authentication system where it may be enabled to submit authentication-related information so that it may be authorized to access the requested network resource.

20 Claims, 1 Drawing Sheet

(56) References Cited

U.S. PATENT DOCUMENTS

| | | | |
|---|---|---|---|
| 4,649,533 | A | 3/1987 | Chorley et al. |
| 4,654,793 | A | 3/1987 | Elrod |
| 4,677,588 | A | 6/1987 | Benjamin |
| 4,691,346 | A | 9/1987 | Vanacore |
| 4,757,267 | A | 7/1988 | Riskin |
| 4,806,743 | A | 2/1989 | Thenery |
| 4,811,011 | A | 3/1989 | Sollinger |
| 4,816,654 | A | 3/1989 | Anderl et al. |
| 5,019,697 | A | 5/1991 | Postman |
| 5,030,807 | A | 7/1991 | Landt et al. |
| 5,065,393 | A | 11/1991 | Sibbitt |
| 5,113,499 | A | 5/1992 | Ankney et al. |
| 5,124,984 | A | 6/1992 | Engel |
| 5,142,622 | A | 8/1992 | Owens |
| 5,148,389 | A | 9/1992 | Hughes |
| 5,149,945 | A | 9/1992 | Johnson et al. |
| 5,159,592 | A | 10/1992 | Perkins |
| 5,166,931 | A | 11/1992 | Riddle |
| 5,185,860 | A | 2/1993 | Wu |
| 5,221,838 | A | 6/1993 | Gutman et al. |
| 5,226,120 | A | 7/1993 | Brown et al. |
| 5,235,595 | A | 8/1993 | O'Dowd |
| 5,243,652 | A | 9/1993 | Teare et al. |
| 5,251,207 | A | 10/1993 | Abensour et al. |
| 5,253,161 | A | 10/1993 | Nemirovsky et al. |
| 5,258,906 | A | 11/1993 | Kroll |
| 5,280,581 | A | 1/1994 | Bathrick et al. |
| 5,287,269 | A | 2/1994 | Dorrough et al. |
| 5,287,461 | A | 2/1994 | Moore |
| 5,289,371 | A | 2/1994 | Abel et al. |
| 5,289,536 | A | 2/1994 | Hokari |
| 5,293,488 | A | 3/1994 | Riley |
| 5,309,437 | A | 5/1994 | Perlman |
| 5,319,648 | A | 6/1994 | Bux et al. |
| 5,321,395 | A | 6/1994 | Van Santbrink |
| 5,325,362 | A | 6/1994 | Aziz |
| 5,329,619 | A | 7/1994 | Page |
| 5,334,821 | A | 8/1994 | Campo et al. |
| 5,335,268 | A | 8/1994 | Kelly, Jr. et al. |
| 5,337,352 | A | 8/1994 | Kobayashi et al. |
| 5,351,186 | A | 9/1994 | Bullock et al. |
| 5,369,705 | A | 11/1994 | Bird |
| 5,371,852 | A | 12/1994 | Attanasio |
| 5,377,060 | A | 12/1994 | Nigam |
| 5,406,555 | A | 4/1995 | Yoshida |
| 5,410,543 | A | 4/1995 | Seitz et al. |
| 5,412,654 | A | 5/1995 | Perkins |
| 5,420,862 | A | 5/1995 | Perlman |
| 5,425,029 | A | 6/1995 | Hluchyj et al. |
| 5,425,085 | A | 6/1995 | Weinberger et al. |
| 5,426,427 | A | 6/1995 | Chinnock et al. |
| 5,430,782 | A | 7/1995 | Brady et al. |
| 5,432,789 | A | 7/1995 | Armstrong et al. |
| 5,442,633 | A | 8/1995 | Perkins et al. |
| 5,446,735 | A | 8/1995 | Tobagi et al. |
| 5,448,623 | A * | 9/1995 | Wiedeman et al. ........... 455/430 |
| 5,481,542 | A | 1/1996 | Logston |
| 5,490,139 | A | 2/1996 | Baker et al. |
| 5,490,252 | A | 2/1996 | Macera |
| 5,517,618 | A | 5/1996 | Wada et al. |
| 5,517,622 | A | 5/1996 | Ivanoff et al. |
| 5,519,769 | A | 5/1996 | Weinberger et al. |
| 5,526,489 | A | 6/1996 | Nilakantan |
| 5,533,026 | A | 7/1996 | Ahmadi |
| 5,538,007 | A | 7/1996 | Gorman |
| 5,539,736 | A | 7/1996 | Johnson |
| 5,548,646 | A | 8/1996 | Aziz |
| 5,550,984 | A | 8/1996 | Gelb |
| 5,553,223 | A | 9/1996 | Greenlee et al. |
| 5,557,677 | A | 9/1996 | Prytz |
| 5,557,748 | A | 9/1996 | Norris |
| 5,572,528 | A | 11/1996 | Shuen |
| 5,574,779 | A | 11/1996 | Ely |
| 5,583,864 | A | 12/1996 | Lightfoot |
| 5,586,121 | A | 12/1996 | Moura et al. |
| 5,586,269 | A | 12/1996 | Kubo |
| 5,592,537 | A | 1/1997 | Moen |
| 5,596,722 | A | 1/1997 | Rahnema |
| 5,598,536 | A | 1/1997 | Slaughter |
| 5,602,991 | A | 2/1997 | Berteau |
| 5,604,896 | A | 2/1997 | Duxbury |
| 5,606,668 | A | 2/1997 | Shwed |
| 5,608,786 | A | 3/1997 | Gordon |
| 5,612,730 | A | 3/1997 | Lewis |
| 5,615,339 | A | 3/1997 | Ban |
| 5,617,540 | A | 4/1997 | Civanlar et al. |
| 5,617,565 | A | 4/1997 | Augenbraun et al. |
| 5,623,600 | A | 4/1997 | Ji et al. |
| 5,623,601 | A | 4/1997 | Vu |
| 5,633,868 | A | 5/1997 | Baldwin et al. |
| 5,633,999 | A | 5/1997 | Clowes |
| 5,636,216 | A | 6/1997 | Fox et al. |
| 5,636,371 | A | 6/1997 | Yu |
| 5,644,719 | A | 7/1997 | Aridas |
| 5,649,001 | A | 7/1997 | Thomas |
| 5,651,002 | A | 7/1997 | Van Seters et al. |
| 5,651,058 | A | 7/1997 | Hackett-Jones et al. |
| 5,652,908 | A | 7/1997 | Douglas |
| 5,657,452 | A | 8/1997 | Kralowetz |
| 5,659,684 | A | 8/1997 | Giovannoni |
| 5,664,102 | A | 9/1997 | Faynberg |
| 5,664,228 | A | 9/1997 | Mital |
| 5,678,041 | A | 10/1997 | Baker |
| 5,694,549 | A | 12/1997 | Carlin et al. |
| 5,696,898 | A | 12/1997 | Baker et al. |
| 5,696,899 | A | 12/1997 | Kalwitz |
| 5,699,520 | A | 12/1997 | Hodgson |
| 5,708,654 | A | 1/1998 | Arndt |
| 5,708,655 | A | 1/1998 | Toth et al. |
| 5,708,780 | A * | 1/1998 | Levergood et al. ........... 709/229 |
| 5,710,883 | A | 1/1998 | Hong et al. |
| 5,717,737 | A | 2/1998 | Doviak |
| 5,724,355 | A | 3/1998 | Bruno et al. |
| 5,724,510 | A | 3/1998 | Arndt |
| 5,727,159 | A | 3/1998 | Kikinis |
| 5,727,950 | A | 3/1998 | Cook et al. |
| 5,740,171 | A | 4/1998 | Mazzola et al. |
| 5,742,604 | A | 4/1998 | Edsall et al. |
| 5,742,668 | A | 4/1998 | Pepe et al. |
| 5,742,762 | A | 4/1998 | Scholl et al. |
| 5,744,789 | A | 4/1998 | Kashi |
| 5,745,699 | A | 4/1998 | Lunn et al. |
| 5,745,884 | A | 4/1998 | Carnegie et al. |
| 5,749,075 | A | 5/1998 | Toader et al. |
| 5,751,961 | A | 5/1998 | Smyk |
| 5,751,971 | A | 5/1998 | Dobbins |
| 5,754,774 | A | 5/1998 | Bittinger et al. |
| 5,757,784 | A | 5/1998 | Liebowitz |
| 5,757,924 | A | 5/1998 | Friedman et al. |
| 5,758,083 | A | 5/1998 | Singh et al. |
| 5,758,186 | A | 5/1998 | Hamilton |
| 5,761,309 | A | 6/1998 | Ohashi et al. |
| 5,761,683 | A | 6/1998 | Logan et al. |
| 5,764,890 | A | 6/1998 | Glasser |
| 5,768,384 | A | 6/1998 | Berson |
| 5,774,535 | A | 6/1998 | Castro |
| 5,774,668 | A | 6/1998 | Choquier |
| 5,774,869 | A | 6/1998 | Toader |
| 5,781,189 | A | 7/1998 | Holleran et al. |
| 5,781,550 | A | 7/1998 | Templin et al. |
| 5,781,552 | A | 7/1998 | Hashimoto |
| 5,781,909 | A | 7/1998 | Logan et al. |
| 5,787,483 | A | 7/1998 | Jam et al. |
| 5,790,541 | A | 8/1998 | Patrick et al. |
| 5,790,548 | A | 8/1998 | Sistanizadeh |
| 5,790,800 | A | 8/1998 | Gauvin et al. |
| 5,793,762 | A | 8/1998 | Penners et al. |
| 5,793,763 | A | 8/1998 | Mayes et al. |
| 5,793,966 | A | 8/1998 | Amstein et al. |
| 5,793,978 | A | 8/1998 | Fowler |
| 5,794,221 | A | 8/1998 | Egendorf |
| 5,796,952 | A | 8/1998 | Davis et al. |
| 5,798,706 | A | 8/1998 | Kraemer et al. |
| 5,802,047 | A | 9/1998 | Kinoshita |

(56) References Cited

U.S. PATENT DOCUMENTS

| | | |
|---|---|---|
| 5,802,285 A | 9/1998 | Hirviniemi |
| 5,802,310 A | 9/1998 | Rajaraman |
| 5,802,320 A | 9/1998 | Baehr et al. |
| 5,802,454 A | 9/1998 | Goshay et al. |
| 5,802,502 A | 9/1998 | Gell et al. |
| 5,805,803 A * | 9/1998 | Birrell et al. ............... 726/12 |
| 5,806,043 A | 9/1998 | Toader |
| 5,809,415 A | 9/1998 | Rossmann |
| 5,812,531 A | 9/1998 | Cheung et al. |
| 5,812,776 A | 9/1998 | Gifford |
| 5,812,786 A | 9/1998 | Seazholtz |
| 5,812,819 A | 9/1998 | Rodwin |
| 5,815,664 A | 9/1998 | Asano |
| 5,818,845 A | 10/1998 | Moura et al. |
| 5,822,526 A | 10/1998 | Waskiewicz |
| 5,825,772 A | 10/1998 | Dobbins et al. |
| 5,832,229 A | 11/1998 | Tomoda |
| 5,835,061 A | 11/1998 | Stewart |
| 5,835,720 A | 11/1998 | Nelson et al. |
| 5,835,724 A | 11/1998 | Smith |
| 5,835,725 A | 11/1998 | Chiang |
| 5,835,727 A | 11/1998 | Wong |
| 5,841,769 A | 11/1998 | Okanoue et al. |
| 5,844,973 A | 12/1998 | Venkatraman |
| 5,845,070 A | 12/1998 | Ikudome |
| 5,848,233 A | 12/1998 | Radia |
| 5,852,812 A | 12/1998 | Reeder |
| 5,854,901 A | 12/1998 | Cole |
| 5,856,974 A | 1/1999 | Gervais |
| 5,859,971 A | 1/1999 | Bittinger et al. |
| 5,862,325 A | 1/1999 | Reed et al. |
| 5,862,328 A | 1/1999 | Colyer |
| 5,862,345 A | 1/1999 | Okanoue et al. |
| 5,864,610 A | 1/1999 | Ronen |
| 5,864,683 A | 1/1999 | Boebert |
| 5,881,234 A | 3/1999 | Schwob |
| 5,884,035 A | 3/1999 | Butman et al. |
| 5,889,470 A | 3/1999 | Kaycee et al. |
| 5,889,958 A | 3/1999 | Willens |
| 5,893,077 A | 4/1999 | Griffin |
| 5,894,321 A | 4/1999 | Downs |
| 5,894,479 A | 4/1999 | Mohammed |
| 5,901,287 A | 5/1999 | Bull et al. |
| 5,903,732 A | 5/1999 | Reed |
| 5,909,441 A | 6/1999 | Alexander, Jr. et al. |
| 5,909,549 A | 6/1999 | Complement |
| 5,910,954 A | 6/1999 | Bronstein et al. |
| 5,915,093 A | 6/1999 | Berlin |
| 5,915,119 A | 6/1999 | Cone |
| 5,916,302 A | 6/1999 | Dunn |
| 5,918,016 A | 6/1999 | Brewer |
| 5,918,018 A | 6/1999 | Gooderum |
| 5,920,699 A | 7/1999 | Bare |
| 5,922,049 A | 7/1999 | Radia |
| 5,923,853 A | 7/1999 | Danneels |
| 5,930,255 A | 7/1999 | Tsukamoto et al. |
| 5,931,917 A | 8/1999 | Nguyen |
| 5,936,542 A | 8/1999 | Kleinrock et al. |
| 5,938,726 A | 8/1999 | Reber et al. |
| 5,940,394 A | 8/1999 | Killian |
| 5,941,947 A | 8/1999 | Brown |
| 5,941,988 A | 8/1999 | Bhagwat et al. |
| 5,946,308 A | 8/1999 | Dobbins et al. |
| 5,946,687 A | 8/1999 | Gehani |
| 5,948,061 A | 9/1999 | Merriman et al. |
| 5,949,875 A | 9/1999 | Walker |
| 5,950,195 A | 9/1999 | Stockwell et al. |
| 5,951,694 A | 9/1999 | Choquier |
| 5,953,398 A | 9/1999 | Hill |
| 5,958,015 A | 9/1999 | Dascalu |
| 5,958,018 A | 9/1999 | Eng |
| 5,960,409 A | 9/1999 | Wexler |
| 5,963,915 A | 10/1999 | Kirsch |
| 5,968,126 A | 10/1999 | Ekstrom |
| 5,968,176 A | 10/1999 | Nessett et al. |
| 5,969,678 A | 10/1999 | Stewart |
| 5,970,490 A | 10/1999 | Morgenstern |
| 5,978,387 A | 11/1999 | Sherman |
| 5,979,757 A | 11/1999 | Tracy et al. |
| 5,982,773 A | 11/1999 | Nishimura |
| 5,987,430 A * | 11/1999 | Van Horne et al. ............ 705/34 |
| 5,987,498 A | 11/1999 | Athing et al. |
| 5,987,523 A | 11/1999 | Hind |
| 5,987,611 A | 11/1999 | Freund |
| 5,991,292 A | 11/1999 | Focsaneanu et al. |
| 5,991,828 A | 11/1999 | Horie et al. |
| 5,999,536 A | 12/1999 | Kawafuji |
| 5,999,912 A | 12/1999 | Wodarz |
| 6,003,770 A | 12/1999 | Schilling |
| 6,006,258 A | 12/1999 | Kalajan |
| 6,006,272 A | 12/1999 | Aravamudan et al. |
| 6,011,782 A | 1/2000 | DeSimone |
| 6,012,083 A | 1/2000 | Savitzky |
| 6,012,088 A | 1/2000 | Li et al. |
| 6,014,698 A | 1/2000 | Griffiths |
| 6,018,771 A | 1/2000 | Hayden |
| 6,024,440 A | 2/2000 | Murthy et al. |
| 6,026,440 A | 2/2000 | Shrader et al. |
| 6,028,848 A | 2/2000 | Bhatia |
| 6,031,836 A | 2/2000 | Haserodt |
| 6,035,281 A | 3/2000 | Crosskey |
| 6,035,405 A | 3/2000 | Gage et al. |
| 6,038,233 A | 3/2000 | Hamamoto |
| 6,041,057 A | 3/2000 | Stone |
| 6,044,062 A | 3/2000 | Brownrigg |
| 6,047,051 A | 4/2000 | Ginzboorg et al. |
| 6,047,268 A | 4/2000 | Bartoli et al. |
| 6,052,120 A | 4/2000 | Nahi et al. |
| 6,052,725 A | 4/2000 | McCann et al. |
| 6,055,236 A | 4/2000 | Nessett |
| 6,055,243 A | 4/2000 | Vincent et al. |
| 6,058,389 A | 5/2000 | Chandra et al. |
| 6,058,418 A | 5/2000 | Kobata |
| 6,058,429 A | 5/2000 | Ames et al. |
| 6,061,334 A | 5/2000 | Berlovitch et al. |
| 6,061,349 A | 5/2000 | Coile |
| 6,061,356 A | 5/2000 | Terry |
| 6,061,650 A | 5/2000 | Malkin |
| 6,061,668 A | 5/2000 | Sharrow |
| 6,061,739 A | 5/2000 | Reed |
| 6,064,674 A | 5/2000 | Doidge |
| 6,070,187 A | 5/2000 | Subramaniam et al. |
| 6,070,191 A | 5/2000 | Narendran et al. |
| 6,070,243 A | 5/2000 | See et al. |
| 6,073,160 A | 6/2000 | Grantham |
| 6,073,175 A | 6/2000 | Tavs |
| 6,075,776 A | 6/2000 | Tanimoto et al. |
| 6,078,953 A | 6/2000 | Vaid et al. |
| 6,084,528 A | 7/2000 | Beach et al. |
| 6,085,247 A | 7/2000 | Parsons, Jr. et al. |
| 6,088,451 A | 7/2000 | He |
| 6,088,725 A | 7/2000 | Kondo et al. |
| 6,091,732 A | 7/2000 | Alexander |
| 6,092,196 A | 7/2000 | Reiche |
| 6,094,659 A | 7/2000 | Bhatia |
| 6,094,663 A | 7/2000 | Snow et al. |
| 6,098,172 A | 8/2000 | Coss et al. |
| 6,101,543 A | 8/2000 | Alden |
| 6,108,330 A | 8/2000 | Bhatia |
| 6,112,239 A | 8/2000 | Kenner et al. |
| 6,115,376 A * | 9/2000 | Sherer et al. ............... 370/389 |
| 6,115,545 A | 9/2000 | Mellquist |
| 6,119,160 A | 9/2000 | Zhang et al. |
| 6,119,161 A | 9/2000 | Lita et al. |
| 6,119,162 A | 9/2000 | Li et al. |
| 6,122,268 A | 9/2000 | Okanoue |
| 6,128,298 A | 10/2000 | Wootton |
| 6,128,601 A | 10/2000 | Van Horne et al. |
| 6,128,664 A | 10/2000 | Yanagidate et al. |
| 6,128,739 A | 10/2000 | Fleming, III |
| 6,130,892 A | 10/2000 | Short et al. |
| 6,134,680 A | 10/2000 | Yeomans |
| 6,137,791 A | 10/2000 | Frid et al. |
| 6,137,869 A | 10/2000 | Voit |

(56) References Cited

U.S. PATENT DOCUMENTS

| | | | |
|---|---|---|---|
| 6,138,142 A | 10/2000 | Linsk | |
| 6,138,144 A | 10/2000 | DeSimone | |
| 6,138,162 A | 10/2000 | Pistriotto et al. | |
| 6,141,010 A | 10/2000 | Hoyle | |
| 6,141,653 A | 10/2000 | Conklin | |
| 6,141,686 A | 10/2000 | Jackowski et al. | |
| 6,141,690 A | 10/2000 | Weiman | |
| 6,144,991 A | 11/2000 | England | |
| 6,147,976 A | 11/2000 | Shand | |
| 6,147,995 A | 11/2000 | Dobbins et al. | |
| 6,148,336 A | 11/2000 | Thomas et al. | |
| 6,154,172 A | 11/2000 | Piccionelli | |
| 6,154,764 A | 11/2000 | Nitta | |
| 6,154,775 A | 11/2000 | Coss | |
| 6,154,839 A | 11/2000 | Arrow | |
| 6,157,377 A | 12/2000 | Shah-Nazaroff | |
| 6,157,647 A | 12/2000 | Husak | |
| 6,157,925 A | 12/2000 | Jenkins et al. | |
| 6,157,946 A | 12/2000 | Itakura et al. | |
| 6,157,953 A | 12/2000 | Chang | |
| 6,158,008 A | 12/2000 | Maria | |
| 6,160,874 A | 12/2000 | Dickerman | |
| 6,161,139 A | 12/2000 | Win et al. | |
| 6,166,730 A | 12/2000 | Goode | |
| 6,167,445 A | 12/2000 | Gai et al. | |
| 6,167,513 A | 12/2000 | Inoue | |
| 6,173,322 B1 | 1/2001 | Hu | |
| 6,175,867 B1 | 1/2001 | Taghodoss | |
| 6,175,869 B1 | 1/2001 | Ahuja et al. | |
| 6,181,699 B1 | 1/2001 | Crinion et al. | |
| 6,182,141 B1 | 1/2001 | Blum et al. | |
| 6,182,154 B1 | 1/2001 | Campagnoni | |
| 6,189,030 B1 | 2/2001 | Kirsch et al. | |
| 6,194,992 B1 | 2/2001 | Short et al. | |
| 6,199,100 B1 | 3/2001 | Filepp | |
| 6,201,962 B1 | 3/2001 | Sturniolo | |
| 6,202,169 B1 | 3/2001 | Razzaghe-Ashrafi | |
| 6,205,148 B1 | 3/2001 | Takahashi | |
| 6,205,481 B1 | 3/2001 | Heddaya et al. | |
| 6,208,977 B1 | 3/2001 | Hernandez et al. | |
| 6,212,560 B1 | 4/2001 | Fairchild | |
| 6,219,694 B1 | 4/2001 | Lazaridis et al. | |
| 6,219,786 B1 | 4/2001 | Cunningham | |
| 6,219,790 B1 | 4/2001 | Lloyd | |
| 6,223,205 B1 | 4/2001 | Harchol-Balter et al. | |
| 6,223,286 B1 | 4/2001 | Hashimoto | |
| 6,226,675 B1 | 5/2001 | Meltzer et al. | |
| 6,226,677 B1 | 5/2001 | Slemmer | |
| 6,226,752 B1 | 5/2001 | Gupta et al. | |
| 6,232,764 B1 | 5/2001 | Rettig et al. | |
| 6,233,604 B1 | 5/2001 | Van Horne et al. | |
| 6,233,618 B1 | 5/2001 | Shannon | |
| 6,233,686 B1 | 5/2001 | Zenchelsky et al. | |
| 6,236,332 B1 | 5/2001 | Conkright et al. | |
| 6,237,026 B1 | 5/2001 | Prasad | |
| 6,237,037 B1 | 5/2001 | Larsson | |
| 6,240,091 B1 | 5/2001 | Ginzboorg | |
| 6,240,402 B1 | 5/2001 | Lynch-Aird | |
| 6,240,513 B1 | 5/2001 | Friedman | |
| 6,240,533 B1 | 5/2001 | Slemmer | |
| 6,243,379 B1 | 6/2001 | Veerina et al. | |
| 6,247,054 B1 | 6/2001 | Malkin | |
| 6,249,527 B1 | 6/2001 | Verthein et al. | |
| 6,249,820 B1 | 6/2001 | Dobbins | |
| 6,253,327 B1 | 6/2001 | Zhang | |
| 6,256,307 B1 | 7/2001 | Salmonson | |
| 6,256,674 B1 | 7/2001 | Manning et al. | |
| 6,259,405 B1 | 7/2001 | Stewart | |
| 6,266,335 B1 | 7/2001 | Bhaskaran | |
| 6,282,180 B1 | 8/2001 | Paneth | |
| 6,286,038 B1 | 9/2001 | Reichmeyer et al. | |
| 6,286,039 B1 | 9/2001 | Van Horne et al. | |
| 6,288,739 B1 | 9/2001 | Hales | |
| 6,292,478 B1 | 9/2001 | Farris | |
| 6,295,291 B1 | 9/2001 | Larkins | |
| 6,298,383 B1 | 10/2001 | Gutman | |
| 6,304,857 B1 | 10/2001 | Heindel | |
| 6,307,836 B1 | 10/2001 | Jones et al. | |
| 6,308,212 B1 | 10/2001 | Besaw | |
| 6,308,213 B1 | 10/2001 | Valencia | |
| 6,308,273 B1 * | 10/2001 | Goertzel et al. | 726/9 |
| 6,310,886 B1 | 10/2001 | Barton | |
| 6,311,275 B1 | 10/2001 | Jin | |
| 6,317,790 B1 | 11/2001 | Bowker et al. | |
| 6,317,837 B1 | 11/2001 | Kenworthy | |
| 6,321,336 B1 | 11/2001 | Applegate | |
| 6,326,918 B1 | 12/2001 | Stewart | |
| 6,327,242 B1 | 12/2001 | Amicangioli et al. | |
| 6,330,586 B1 | 12/2001 | Yates | |
| 6,331,983 B1 | 12/2001 | Haggerty et al. | |
| 6,338,046 B1 | 1/2002 | Saari et al. | |
| 6,339,595 B1 | 1/2002 | Rekhter et al. | |
| 6,343,066 B2 | 1/2002 | Magill et al. | |
| 6,345,291 B2 | 2/2002 | Murphy, Jr. et al. | |
| 6,349,289 B1 | 2/2002 | Peterson et al. | |
| 6,353,614 B1 | 3/2002 | Borella et al. | |
| 6,359,892 B1 | 3/2002 | Szlam | |
| 6,366,893 B2 | 4/2002 | Hannula | |
| 6,370,142 B1 | 4/2002 | Pitcher et al. | |
| 6,377,982 B1 | 4/2002 | Rai | |
| 6,377,990 B1 | 4/2002 | Slemmer et al. | |
| 6,381,646 B2 | 4/2002 | Zhang | |
| 6,381,650 B1 | 4/2002 | Peacock | |
| 6,385,653 B1 | 5/2002 | Sitaraman et al. | |
| 6,389,462 B1 | 5/2002 | Cohen | |
| 6,393,466 B1 | 5/2002 | Hickman et al. | |
| 6,393,468 B1 | 5/2002 | McGee | |
| 6,393,484 B1 | 5/2002 | Massarani | |
| 6,397,255 B1 | 5/2002 | Nurenberg et al. | |
| 6,405,258 B1 | 6/2002 | Erimli et al. | |
| 6,408,336 B1 | 6/2002 | Schneider et al. | |
| 6,410,543 B1 | 6/2002 | Strobel et al. | |
| 6,412,073 B1 | 6/2002 | Rangan | |
| 6,414,635 B1 | 7/2002 | Stewart et al. | |
| 6,418,118 B1 | 7/2002 | Hay et al. | |
| 6,418,324 B1 | 7/2002 | Doviak | |
| 6,424,636 B1 | 7/2002 | Seazholtz | |
| 6,424,659 B2 | 7/2002 | Viswanadham et al. | |
| 6,425,003 B1 | 7/2002 | Herzog et al. | |
| 6,427,170 B1 | 7/2002 | Sitaraman et al. | |
| 6,427,174 B1 | 7/2002 | Sitaraman et al. | |
| 6,430,621 B1 | 8/2002 | Srikanth et al. | |
| 6,434,619 B1 | 8/2002 | Lim et al. | |
| 6,434,627 B1 | 8/2002 | Millet et al. | |
| 6,438,125 B1 | 8/2002 | Brothers | |
| 6,438,528 B1 | 8/2002 | Jensen | |
| 6,438,578 B1 | 8/2002 | Schmid | |
| 6,452,498 B2 | 9/2002 | Stewart | |
| 6,453,353 B1 | 9/2002 | Win | |
| 6,453,356 B1 | 9/2002 | Sheard et al. | |
| 6,453,361 B1 | 9/2002 | Morris | |
| 6,460,084 B1 | 10/2002 | Van Horne et al. | |
| 6,463,051 B1 | 10/2002 | Ford | |
| 6,463,473 B1 | 10/2002 | Gubbi | |
| 6,463,474 B1 | 10/2002 | Fuh | |
| 6,463,478 B1 | 10/2002 | Lau et al. | |
| 6,466,076 B2 | 10/2002 | Yoshikawa | |
| 6,466,976 B1 | 10/2002 | Alles | |
| 6,466,981 B1 * | 10/2002 | Levy | 709/227 |
| 6,466,986 B1 | 10/2002 | Sawyer et al. | |
| 6,470,027 B1 * | 10/2002 | Birrell, Jr. | 370/465 |
| 6,470,385 B1 | 10/2002 | Nakashima et al. | |
| 6,470,386 B1 | 10/2002 | Combar | |
| 6,473,411 B1 | 10/2002 | Kumaki | |
| 6,480,486 B2 | 11/2002 | Kikinis | |
| 6,487,538 B1 | 11/2002 | Gupta | |
| 6,487,605 B1 | 11/2002 | Leung | |
| 6,490,620 B1 | 12/2002 | Ditmer et al. | |
| 6,496,516 B1 | 12/2002 | Dabecki et al. | |
| 6,496,704 B2 | 12/2002 | Yuan et al. | |
| 6,496,850 B1 | 12/2002 | Bowman-Amuah | |
| 6,502,131 B1 | 12/2002 | Vaid et al. | |
| 6,505,201 B1 | 1/2003 | Haitsuka et al. | |
| 6,510,531 B1 | 1/2003 | Gibbons | |

(56) References Cited

U.S. PATENT DOCUMENTS

| | | |
|---|---|---|
| 6,512,754 B2 | 1/2003 | Feder et al. |
| 6,513,060 B1 | 1/2003 | Nixon et al. |
| 6,515,989 B1 | 2/2003 | Ronneke |
| 6,516,416 B2 | 2/2003 | Gregg et al. |
| 6,519,636 B2 | 2/2003 | Engel |
| 6,519,643 B1 | 2/2003 | Foulkes |
| 6,523,028 B1 | 2/2003 | DiDomizio |
| 6,526,052 B1 | 2/2003 | Rijhsinghani et al. |
| 6,526,056 B1 | 2/2003 | Rekhter et al. |
| 6,535,493 B1 | 3/2003 | Lee et al. |
| 6,535,511 B1 | 3/2003 | Rao |
| 6,539,395 B1 | 3/2003 | Gjerdingen et al. |
| 6,539,422 B1 | 3/2003 | Hunt et al. |
| 6,539,431 B1 | 3/2003 | Sitaraman et al. |
| 6,546,392 B1 | 4/2003 | Bahlmann |
| 6,546,425 B1 | 4/2003 | Hanson et al. |
| 6,549,220 B1 | 4/2003 | Hsu |
| 6,549,516 B1 | 4/2003 | Albert et al. |
| 6,553,178 B2 | 4/2003 | Abecassis |
| 6,557,038 B1 | 4/2003 | Becker |
| 6,563,793 B1 | 5/2003 | Golden et al. |
| 6,567,405 B1 | 5/2003 | Borella et al. |
| 6,571,221 B1 | 5/2003 | Stewart |
| 6,574,664 B1 | 6/2003 | Liu |
| 6,577,642 B1 | 6/2003 | Fijolek |
| 6,578,078 B1 | 6/2003 | Smith et al. |
| 6,580,717 B1 | 6/2003 | Higuchi |
| 6,584,505 B1 | 6/2003 | Howard |
| 6,587,880 B1 | 7/2003 | Saigo |
| 6,591,306 B1 | 7/2003 | Redlich |
| 6,597,693 B1 | 7/2003 | Leung |
| 6,598,167 B2 | 7/2003 | Devine et al. |
| 6,601,065 B1 | 7/2003 | Nelson et al. |
| 6,609,153 B1 | 8/2003 | Salkewicz |
| 6,609,154 B1 | 8/2003 | Fuh |
| 6,615,212 B1 | 9/2003 | Dutta et al. |
| 6,615,215 B1 | 9/2003 | Petty |
| 6,618,355 B1 | 9/2003 | Gulliford et al. |
| 6,618,398 B1 | 9/2003 | Marchetti et al. |
| 6,625,121 B1 | 9/2003 | Lau et al. |
| 6,625,645 B1 | 9/2003 | Van Horne |
| 6,633,899 B1 | 10/2003 | Coward |
| 6,636,504 B1 | 10/2003 | Albers |
| 6,636,894 B1 | 10/2003 | Short et al. |
| 6,640,072 B1 | 10/2003 | Wiget et al. |
| 6,643,701 B1 | 11/2003 | Aziz et al. |
| 6,654,808 B1 | 11/2003 | Chuah |
| 6,658,625 B1 | 12/2003 | Allen |
| 6,665,718 B1 | 12/2003 | Chuah |
| 6,667,968 B1 | 12/2003 | Tran |
| 6,671,379 B2 | 12/2003 | Nemirovski |
| 6,671,739 B1 | 12/2003 | Reed |
| 6,675,208 B1 | 1/2004 | Rai et al. |
| 6,681,330 B2 | 1/2004 | Bradford et al. |
| 6,687,732 B1 | 2/2004 | Bector |
| 6,691,227 B1 | 2/2004 | Neves et al. |
| 6,694,437 B1 | 2/2004 | Pao et al. |
| 6,697,018 B2 | 2/2004 | Stewart |
| 6,701,350 B1 | 3/2004 | Mitchell |
| 6,701,361 B1 | 3/2004 | Meier |
| 6,711,146 B2 | 3/2004 | Yegoshin |
| 6,714,987 B1 | 3/2004 | Amin |
| 6,717,943 B1 | 4/2004 | Schwering |
| 6,724,767 B1 | 4/2004 | Chong et al. |
| 6,728,792 B2 | 4/2004 | Wagner |
| 6,728,884 B1 | 4/2004 | Lim |
| 6,728,920 B1 | 4/2004 | Ebersman |
| 6,731,612 B1 | 5/2004 | Koss |
| 6,732,176 B1 | 5/2004 | Stewart |
| 6,735,633 B1 | 5/2004 | Welch et al. |
| 6,735,691 B1 | 5/2004 | Capps |
| 6,738,371 B1 | 5/2004 | Ayres |
| 6,738,382 B1 | 5/2004 | West |
| 6,742,036 B1 | 5/2004 | Das et al. |
| 6,751,677 B1 | 6/2004 | Ilnicki |
| 6,754,831 B2 | 6/2004 | Brownell |
| 6,757,740 B1 | 6/2004 | Parekh et al. |
| 6,759,960 B2 | 7/2004 | Stewart |
| 6,760,416 B1 | 7/2004 | Banks et al. |
| 6,760,444 B1 | 7/2004 | Leung |
| 6,771,609 B1 | 8/2004 | Gudat et al. |
| 6,771,661 B1 | 8/2004 | Chawla |
| 6,775,267 B1 | 8/2004 | Kung |
| 6,775,290 B1 | 8/2004 | Merchant et al. |
| 6,779,035 B1 | 8/2004 | Gbadegesin |
| 6,779,118 B1 | 8/2004 | Ikudome |
| 6,785,704 B1 | 8/2004 | McCanne |
| 6,785,730 B1 | 8/2004 | Taylor |
| 6,789,110 B1 | 9/2004 | Short |
| 6,795,852 B1 | 9/2004 | Kleinrock et al. |
| 6,795,856 B1 | 9/2004 | Bunch |
| 6,810,426 B2 | 10/2004 | Mysore et al. |
| 6,822,954 B2 | 11/2004 | McConnell et al. |
| 6,822,955 B1 | 11/2004 | Brothers |
| 6,823,059 B2 | 11/2004 | Kalmanek |
| 6,826,694 B1 | 11/2004 | Dutta et al. |
| 6,829,239 B1 | 12/2004 | Bhatia et al. |
| 6,834,341 B1 | 12/2004 | Bahl |
| 6,839,757 B1 | 1/2005 | Romano |
| 6,850,532 B2 | 2/2005 | Thubert |
| 6,856,676 B1 | 2/2005 | Pirot et al. |
| 6,856,800 B1 | 2/2005 | Henry et al. |
| 6,857,009 B1 | 2/2005 | Ferreria et al. |
| 6,868,399 B1 | 3/2005 | Short et al. |
| 6,876,668 B1 | 4/2005 | Chawla |
| 6,892,226 B1 | 5/2005 | Tso |
| 6,901,433 B2 | 5/2005 | San Andres |
| 6,907,449 B2 | 6/2005 | Srinivasan |
| 6,915,345 B1 | 7/2005 | Tummala |
| 6,922,672 B1 | 7/2005 | Hailpern |
| 6,934,754 B2 | 8/2005 | West et al. |
| 6,937,597 B1 | 8/2005 | Rosenberg et al. |
| 6,944,661 B2 | 9/2005 | Moore et al. |
| 6,947,398 B1 | 9/2005 | Ahmed |
| 6,950,433 B1 | 9/2005 | Okamoto |
| 6,950,628 B1 | 9/2005 | Meier et al. |
| 6,961,762 B1 | 11/2005 | Yeap |
| 6,970,927 B1 | 11/2005 | Stewart |
| 6,983,327 B2 | 1/2006 | Koperda |
| 6,985,479 B2 | 1/2006 | Leung et al. |
| 6,993,595 B1 | 1/2006 | Luptowski et al. |
| 6,996,073 B2 | 2/2006 | West |
| 7,003,578 B2 | 2/2006 | Kanada et al. |
| 7,007,080 B2 * | 2/2006 | Wilson .......................... 709/221 |
| 7,009,556 B2 | 3/2006 | Stewart |
| 7,016,960 B2 | 3/2006 | Howard |
| 7,017,046 B2 | 3/2006 | Doyle et al. |
| 7,020,082 B2 | 3/2006 | Bhagavath et al. |
| 7,020,681 B1 | 3/2006 | Ayyagari et al. |
| 7,032,243 B2 | 4/2006 | Leerssen et al. |
| 7,035,248 B2 | 4/2006 | Wengrovitz |
| 7,043,532 B1 | 5/2006 | Humpleman et al. |
| 7,043,563 B2 | 5/2006 | Vange et al. |
| 7,047,415 B2 | 5/2006 | Doyle et al. |
| 7,051,087 B1 | 5/2006 | Bahl et al. |
| 7,058,594 B2 | 6/2006 | Stewart |
| 7,072,056 B1 | 7/2006 | Greaves et al. |
| 7,080,077 B2 | 7/2006 | Ramamurthy |
| 7,086,077 B2 | 8/2006 | Giammaressi |
| 7,086,085 B1 | 8/2006 | Brown et al. |
| 7,088,727 B1 | 8/2006 | Short et al. |
| 7,093,020 B1 | 8/2006 | McCarty et al. |
| 7,117,526 B1 | 10/2006 | Short |
| 7,120,678 B2 | 10/2006 | Greuel |
| 7,120,701 B2 | 10/2006 | Warrier et al. |
| 7,124,437 B2 | 10/2006 | Byrne |
| 7,126,915 B1 | 10/2006 | Lu |
| 7,139,268 B1 | 11/2006 | Bhagwat et al. |
| 7,145,898 B1 | 12/2006 | Elliott |
| 7,151,758 B2 | 12/2006 | Kumaki et al. |
| 7,159,035 B2 | 1/2007 | Garcia-Luna-Aceves et al. |
| 7,185,360 B1 | 2/2007 | Anton et al. |
| 7,188,085 B2 | 3/2007 | Pelletier |
| 7,194,554 B1 | 3/2007 | Short et al. |

(56) References Cited

U.S. PATENT DOCUMENTS

| | | |
|---|---|---|
| 7,197,556 B1 | 3/2007 | Short et al. |
| 7,210,035 B2 | 4/2007 | Doyle et al. |
| 7,216,043 B2 | 5/2007 | Ransom et al. |
| 7,216,152 B2 | 5/2007 | Short et al. |
| 7,225,249 B1 | 5/2007 | Barry |
| 7,240,106 B2 | 7/2007 | Cochran et al. |
| 7,269,653 B2 | 9/2007 | Mentze et al. |
| 7,272,639 B1 | 9/2007 | Levergood et al. |
| 7,272,842 B2 | 9/2007 | Kay et al. |
| 7,283,542 B2 | 10/2007 | Mitchell |
| 7,287,071 B2 | 10/2007 | MacLean |
| 7,289,763 B2 | 10/2007 | Dennison et al. |
| 7,293,077 B1 | 11/2007 | Teo |
| 7,313,631 B1 | 12/2007 | Sesmun et al. |
| 7,319,673 B1 | 1/2008 | Briscoe |
| 7,324,972 B1 | 1/2008 | Oliver |
| 7,325,063 B2 | 1/2008 | Dillon |
| 7,333,500 B2 | 2/2008 | Roshko |
| 7,336,960 B2 | 2/2008 | Zavalkovsky et al. |
| 7,349,982 B2 | 3/2008 | Hannum et al. |
| 7,356,841 B2 | 4/2008 | Wilson et al. |
| 7,359,395 B2 | 4/2008 | Toporek et al. |
| 7,373,655 B1 * | 5/2008 | Maria ............................. 726/2 |
| 7,376,113 B2 | 5/2008 | Taylor et al. |
| 7,401,120 B2 | 7/2008 | Walbeck |
| 7,428,413 B2 | 9/2008 | Fink |
| 7,437,474 B2 | 10/2008 | Iyer et al. |
| 7,472,191 B2 | 12/2008 | Stewart |
| 7,474,617 B2 | 1/2009 | Molen et al. |
| 7,493,084 B2 | 2/2009 | Meier et al. |
| 7,493,402 B2 | 2/2009 | McCarty et al. |
| 7,512,136 B2 | 3/2009 | Korotin |
| 7,526,538 B2 | 4/2009 | Wilson |
| 7,536,714 B2 | 5/2009 | Yuan |
| 7,539,291 B2 | 5/2009 | D'Angelo et al. |
| 7,552,090 B1 | 6/2009 | Barber |
| 7,554,995 B2 | 6/2009 | Short |
| 7,555,542 B1 | 6/2009 | Ayers et al. |
| 7,580,376 B2 | 8/2009 | West |
| 7,602,782 B2 | 10/2009 | Doviak |
| 7,685,311 B2 | 3/2010 | Friedman et al. |
| 7,689,710 B2 | 3/2010 | Tang et al. |
| 7,689,716 B2 | 3/2010 | Short et al. |
| 7,698,377 B2 | 4/2010 | Parekh et al. |
| 7,698,432 B2 | 4/2010 | Short et al. |
| 7,706,266 B2 | 4/2010 | Plamondon |
| 7,739,383 B1 | 6/2010 | Short et al. |
| 7,743,404 B1 | 6/2010 | Deutschmann et al. |
| 7,748,033 B2 | 6/2010 | Nita et al. |
| 7,752,334 B2 | 7/2010 | Paunikar et al. |
| 7,774,612 B1 | 8/2010 | Deutschmann et al. |
| 7,783,777 B1 | 8/2010 | Pabla et al. |
| 7,809,126 B2 | 10/2010 | Marascio et al. |
| 7,813,741 B2 | 10/2010 | Hendrey et al. |
| 7,818,454 B2 | 10/2010 | Kim et al. |
| 7,822,871 B2 | 10/2010 | Stolorz et al. |
| 7,822,873 B1 | 10/2010 | Paunikar |
| 7,844,729 B1 | 11/2010 | Friedman et al. |
| 7,953,857 B2 | 5/2011 | Short et al. |
| 7,954,144 B1 | 5/2011 | Ebrahimi et al. |
| 8,051,206 B2 | 11/2011 | Paunikar et al. |
| 8,156,246 B2 | 4/2012 | Short et al. |
| 8,190,708 B1 | 5/2012 | Short et al. |
| 8,234,409 B2 | 7/2012 | Paunikar et al. |
| 8,244,886 B2 | 8/2012 | Short et al. |
| 8,266,266 B2 | 9/2012 | Short et al. |
| 8,266,269 B2 | 9/2012 | Short et al. |
| 8,370,477 B2 | 2/2013 | Short et al. |
| 8,370,524 B2 | 2/2013 | Paunikar et al. |
| 8,516,083 B2 | 8/2013 | Short et al. |
| 2001/0003823 A1 | 6/2001 | Mighdoll et al. |
| 2001/0044818 A1 | 11/2001 | Liang |
| 2001/0054020 A1 | 12/2001 | Barth et al. |
| 2002/0006788 A1 | 1/2002 | Knutsson et al. |
| 2002/0016736 A1 | 2/2002 | Cannon et al. |
| 2002/0021689 A1 | 2/2002 | Robbins |
| 2002/0097674 A1 | 7/2002 | Balabhadrapatreuni et al. |
| 2002/0133412 A1 | 9/2002 | Oliver et al. |
| 2002/0152311 A1 | 10/2002 | Veltman et al. |
| 2002/0178070 A1 | 11/2002 | Leveridge |
| 2003/0067911 A1 | 4/2003 | Kikinis |
| 2003/0069991 A1 | 4/2003 | Brescia |
| 2003/0083889 A1 | 5/2003 | Macklin |
| 2004/0015572 A1 | 1/2004 | Kang |
| 2004/0030797 A1 | 2/2004 | Akinlar et al. |
| 2004/0039798 A1 | 2/2004 | Hotz et al. |
| 2004/0076144 A1 | 4/2004 | Ishidoshiro |
| 2004/0203752 A1 | 10/2004 | Wojaczynski et al. |
| 2005/0021943 A1 | 1/2005 | Ikudome |
| 2005/0102205 A1 | 5/2005 | Yamamoto |
| 2005/0114497 A1 | 5/2005 | Mani et al. |
| 2005/0143065 A1 | 6/2005 | Pathan et al. |
| 2005/0148342 A1 | 7/2005 | Sylvain |
| 2005/0260973 A1 | 11/2005 | van de Groenendaal |
| 2006/0026170 A1 | 2/2006 | Kreitler et al. |
| 2006/0080446 A1 | 4/2006 | Bahl |
| 2006/0089122 A1 | 4/2006 | Zavalkovsky et al. |
| 2006/0135155 A1 | 6/2006 | Chung et al. |
| 2006/0174019 A1 | 8/2006 | Ikudome |
| 2007/0011268 A1 | 1/2007 | Banga et al. |
| 2007/0162598 A1 | 7/2007 | Gorodyansky |
| 2007/0201702 A1 | 8/2007 | Hendricks |
| 2007/0266125 A1 | 11/2007 | Lu et al. |
| 2007/0271598 A1 | 11/2007 | Chen et al. |
| 2007/0294417 A1 | 12/2007 | Ikudome |
| 2008/0148383 A1 | 6/2008 | Pitchaikani et al. |
| 2008/0271109 A1 | 10/2008 | Singh et al. |
| 2009/0024745 A1 | 1/2009 | Short et al. |
| 2010/0115113 A1 | 5/2010 | Short et al. |
| 2010/0332615 A1 | 12/2010 | Short et al. |
| 2011/0030037 A1 | 2/2011 | Olshansky et al. |
| 2011/0131339 A1 | 6/2011 | Brown et al. |
| 2012/0185586 A1 | 7/2012 | Olshansky |
| 2012/0290724 A1 | 11/2012 | Noro et al. |
| 2012/0297459 A1 | 11/2012 | Olshansky et al. |
| 2012/0300788 A1 | 11/2012 | Olshansky et al. |
| 2013/0055358 A1 | 2/2013 | Short et al. |

FOREIGN PATENT DOCUMENTS

| | | |
|---|---|---|
| CA | 2330857 | 11/1999 |
| CA | 2296937 | 7/2000 |
| EP | 0573739 | 12/1993 |
| EP | 0742657 | 11/1996 |
| EP | 0762707 | 3/1997 |
| EP | 0767595 | 4/1997 |
| EP | 0848338 | 6/1998 |
| EP | 0873037 | 10/1998 |
| EP | 0889418 | 1/1999 |
| EP | 0901301 | 3/1999 |
| EP | 0909073 | 4/1999 |
| EP | 0912026 | 4/1999 |
| EP | 0917318 | 5/1999 |
| EP | 0924913 | 6/1999 |
| EP | 0946027 | 9/1999 |
| EP | 1076975 | 11/1999 |
| EP | 0986230 | 3/2000 |
| EP | 1222791 | 5/2001 |
| EP | 1111872 | 6/2001 |
| EP | 0560706 | 4/2006 |
| EP | 1026853 | 12/2007 |
| EP | 2093928 | 4/2011 |
| GB | 2283645 | 5/1995 |
| GB | 2311439 | 9/1997 |
| GB | 2326306 | 12/1998 |
| JP | 5-344122 | 12/1993 |
| JP | 6-209319 | 7/1994 |
| JP | 06-348625 | 12/1994 |
| JP | 7-030575 | 1/1995 |
| JP | 7-066809 | 3/1995 |
| JP | 7-202931 | 8/1995 |
| JP | 8-065306 | 3/1996 |
| JP | 8-242231 | 9/1996 |
| JP | 8-265372 | 10/1996 |

(56) References Cited

FOREIGN PATENT DOCUMENTS

| JP | 08-265372 | 11/1996 |
|---|---|---|
| JP | 9-046352 | 2/1997 |
| JP | 09-305514 | 11/1997 |
| JP | 10-105516 A | 4/1998 |
| JP | 10-107839 | 4/1998 |
| JP | 11-055326 | 2/1999 |
| JP | 11-055726 | 2/1999 |
| JP | 11-177626 | 7/1999 |
| JP | 11-282804 A | 10/1999 |
| JP | 2002-514802 | 11/1999 |
| JP | 2000-059416 | 2/2000 |
| JP | 2000-111870 | 4/2000 |
| JP | 2000-354127 | 12/2000 |
| JP | 2002-111870 | 4/2002 |
| JP | 4471554 | 3/2010 |
| JP | 4791589 | 7/2011 |
| JP | 4846036 | 10/2011 |
| JP | 5047436 | 7/2012 |
| JP | 5084086 | 9/2012 |
| WO | WO 95/27942 | 10/1995 |
| WO | WO 96/05549 | 2/1996 |
| WO | WO 96/39668 | 12/1996 |
| WO | WO 97/02687 | 1/1997 |
| WO | WO 97/09672 | 3/1997 |
| WO | WO 97/11429 | 3/1997 |
| WO | WO 97/22936 | 6/1997 |
| WO | WO 97/27546 | 7/1997 |
| WO | WO 97/41586 | 11/1997 |
| WO | WO 97/48210 | 12/1997 |
| WO | WO 98/11702 | 3/1998 |
| WO | WO 98/12643 | 3/1998 |
| WO | WO 98/16036 | 4/1998 |
| WO | WO 98/16044 | 4/1998 |
| WO | WO 98/36587 | 8/1998 |
| WO | WO 98/40990 | 9/1998 |
| WO | WO 98/54868 | 12/1998 |
| WO | WO 98/57465 | 12/1998 |
| WO | WO 99/01819 | 1/1999 |
| WO | WO 99/15995 | 4/1999 |
| WO | WO 99/28819 | 6/1999 |
| WO | WO 99/38303 | 7/1999 |
| WO | WO 99/39481 | 8/1999 |
| WO | WO 99/55056 | 10/1999 |
| WO | WO 99/57837 | 11/1999 |
| WO | WO 99/57865 | 11/1999 |
| WO | WO 99/57866 | 11/1999 |
| WO | WO 99/65183 | 12/1999 |
| WO | WO 99/66400 | 12/1999 |
| WO | WO 00/27092 | 5/2000 |
| WO | WO 00/58804 | 10/2000 |
| WO | WO 00/79406 A | 12/2000 |
| WO | WO 01/03011 | 1/2001 |
| WO | WO 01/30130 | 5/2001 |
| WO | WO 01/63835 A | 8/2001 |
| WO | WO 02/067531 | 8/2002 |
| WO | WO 2004/017658 | 2/2004 |
| WO | WO 2004/100499 | 11/2004 |

OTHER PUBLICATIONS

Case No. 09-CV-8441 DDP (VBKx), *Nomadix, Inc. v. Hewlett-Packard Co. et al.*, Defendants' Supplemental Invalidity Contentions Regarding the SPINACH Prior Art and the Vos Publication, dated Nov. 21, 2011, 64 pages including Exhibits I4, S1-S3, and V1-V3.
Request for Reexamination of U.S. Pat. No. 6,636,894, filed Nov. 18, 2011, Control No. 95/001,831, 191 pages including Exhibits CC-A through CC-I.
Vos, Jos and Willy Konijnenberg, Linux Firewall Facilities for Kernel-level Packet Screening, Nov. 18, 1996, 19 pages.
Chen, et al.: "Popeye—Using Fine-grained Network Access Control to Support Mobile Users and Protect Intranet Hosts", Dec. 11, 2000.
Poger, et al.: "Secure Public Internet Access Handler (SPINACH)", Dec. 1997.
Appenzeller, et al: "User-Friendly Access Control for Public Network Ports", Mar. 1999.
US 5,852,325, Jan. 19, 1999, Reed et al., (withdrawn).
Aceves, Wireless Internet Gateways (Wings), Proc. IEEE MILCOM '97, Monterey, California, Nov. 1997.
Agrawal, Swan: A Mobile Multimedia Wireless Network, IEEE Personal Communications, Apr. 1996.
Alexander, Active Bridging, University of Pennsylvania Technical Report No. MS-CIS-97-02, Jan. 1997.
Alonso, Database system issues in nomadic computing; Proceedings of the 1993 ACM SIGMOD International Conference on Management of Data, May 26, 1993.
Altmann, (Workshop '99) Assisting Users in Complex Purchasing Decisions, Jan. 12, 1999.
Altmann, Index Project: User support for buying QoS with regard to user's preferences, Sixth International Workshop on Quality of Service, May 18, 1998.
Amadio, Modelling IP Mobility, Nov. 1997.
Anderson, et al., The Magicrouter, an Application of Fast Packet Interposing, dated May 17, 1996 in 12 pages.
Aoyama, The Cost of Adaptivity and Virtual Lanes in a Wormhole Router, 1995.
Apostolopoulos, G., et al.: "IBM Research Report L5: A Self Learning Layer-5 Switch", Computer Science/Mathematics, RC 21461(96867)Apr. 29, 1999, pp. 1-19.
Babbage, Internet phone—changing the telephony paradigm?, BT Technology Journal, vol. 15, Iss. 2, Apr. 1997.
Badrinath, To Send or not to Send: Implementing Deferred Transmissions in a Mobile Host, Proceedings of 16th International Conference on Distributed Computing Systems, May 27, 1996.
Bagrodia, Vision, Issues, and Architecture for Nomadic Computing, IEEE Personal Communications, Dec. 1995.
Baker, Local Control Over Filtered WWW Access, Fourth International World Wide Web Conference, Dec. 13, 1995.
Baker, M., et al.: Supporting Mobility in MosquitoNet, Proceedings of the 1996 USENIX Technical Conference, San Diego, CA Jan. 1996.
Baker, RFC 1812; Requirements for IP Version 4 Routers, Jun. 1995.
Beigl, System Support for Mobile Computing, Computers & Graphics, vol. 20, Iss. 5, Sep. 1996.
Berkowitz, Howard C.: Pier Working Group, Router Renumbering Guide, Aug. 1996, http://tools.ietf.org/pdf/draft-ietf-pier-rr-02.pdf.
Bestavros, A. and Michael J. Ocean, Chapter 12: "Virtualization and Programming Support for Video Sensor Networks with Application to Wireless and Physical Security," Distributed Video Sensor Networks, 2011, pp. 179-192.
Bieszczad, Towards plug-and-play networks with mobile code, Proceedings of the International Conference for Computer Communications ICCC'97, Mar. 1997.
Bjorn, The Case for Quality of Service on Demand Empirical Evidence from the INDEX Project, ISQE'99, Workshop on Internet Service Quality Economics, Cambridge, MA, USA, Dec. 1999.
Blackwell, Secure Short-Cut Routing for Mobile IP, Proceedings of the USENIX Summer 1994 Technical Conference on USENIX Summer 1994 Technical Conference, Jun. 10, 1994.
Boutell, CGI Programming in C & Perl, 1996.
Braden, RFC 1122 Requirements for Internet Hosts—Communication Layers, Oct. 1989.
Brattli, The Software Network, Providing Continuous Network Connectivity for Multihoming Mobile Computers, Dec. 16, 1996.
Broman, Implementation and Analyses of the Mobile-IP Protocol, Jan. 25, 1996.
Brown, A Strategic Plan for Ubiquitous Laptop computing, vol. 41, No. 1, Communications of the ACM, Jan. 1998.
Brown, M-TCP: TCP for Mobile Cellular Networks, Jul. 29, 1997.
Bush, Mobile ATM Orderwire and Network Configuration, 1996.
Caceres, Fast & Scalable Handoffs for Wireless Internetworks, Proceedings of the 2nd annual international conference on Mobile computing and networking, Nov. 1996.
Caronni et al., Efficient Security for Large and Dynamic Multicast Groups, Jun. 1998.

(56) References Cited

OTHER PUBLICATIONS

Case No. 07-1946 GPS (VBK) *Nomadix, Inc. v. Second Rule LLC*, First Amended Answer, Affirmative Defenses and Counterclaims of Second Rule LLC, Jul. 16, 2007.
Case No. 07-1946 GPS (VBK) *Nomadix, Inc. v. Second Rule LLC*, Plaintiffs Reply to Defendant's First Amended Answer and Counterclaims and Demand for Jury Trial, Jul. 31, 2007.
Case No. 07-1946 GPS (VBK) *Nomadix, Inc. v. Second Rule LLC*, Defendant's Response to Plaintiffs Claim Chart, dated Feb. 19, 2008.
Case No. 07-1946 GPS (VBK) *Nomadix, Inc. v. Second Rule LLC*, Defendant's First Supplemental Response to Plaintiff's Claim Chart dated Apr. 18, 2008.
Case No. 07-1946 DDP (VBKx) *Nomadix, Inc. v. Second Rule LLC*, Declaration of Don P. Foster re: Second Rule LLC's Opening Claim Construction Brief, dated Aug. 4, 2008.
Case No. 07-1946 DDP (VBKx) *Nomadix, Inc. v. Second Rule LLC*, Declaration of Mark Lezama in Support of Nomadix, Inc.'s Opening Claim Construction Brief, dated Aug. 4, 2008.
Case No. 07-1946 DDP (VBKx) *Nomadix, Inc. v. Second Rule LLC*, Amended Claim Constructions Order (Motion filed on Aug. 4, 2008).
Case No. 07-1946 DDP (VBKx) *Nomadix, Inc. v. Second Rule LLC*, Declaration of Douglas G. Muehlhauser in Support of Nomadix Inc.'s Claim Construction Brief, dated Aug. 22, 2008.
Case No. 07-1946 DDP (VBKx) *Nomadix, Inc. v. Second Rule LLC*, Declaration of Mark Lezama in Support of Nomadix, Inc.'s Reply Claim Construction Brief, dated Aug. 22, 2008.
Case No. 07-1946 DDP (VBKx) *Nomadix, Inc. v. Second Rule LLC*, Order Requesting Supplemental Briefing, dated Oct. 21, 2008.
Case No. 07-1946 DDP (VBKx) *Nomadix, Inc. v. Second Rule LLC*, Defendant's Supplemental Post-Hearing Claim Construction Brief., dated Sep. 26, 2008.
Case No. 07-1946 DDP (VBKx) *Nomadix, Inc. v. Second Rule LLC*, Nomadix, Inc.'s Supplemental Claim Construction Brief, dated Sep. 26, 2008.
Case No. 2:08-cv-00264-DF-CE, *Linksmart Wireless Technology, LLC, v. T-Mobile USA, Inc., et al.*, Declaration of Kevin Jeffay, Ph.D., filed Apr. 16, 2010.
Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011.
Exhibit A, Asserted Claims, filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011, in 2 pages.
Exhibit B, Supplemental Prior Art List filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011, in 2 pages.
Exhibit C1, Claim Comparison for U.S. Patent No. 6,130,892 filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011, in 4 pages.
Exhibit C2, Claim Comparison for U.S. Patent No. 7,088,727 filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011, in 7 pages.
Exhibit C3, Claim Comparison for U.S. Patent No. 7,554,995 filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011, in 25 pages.
Exhibit C4, Claim Comparison for U.S. Patent No. 6,636,894, filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011, in 18 pages.
Exhibit C5, Claim Comparison for U.S. Patent No. 7,194,554 filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011, in 18 pages.
Exhibit C6, Claim Comparison for U.S. Patent No. 6,868,399 filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011, in 22 pages.
Exhibit C7, U.S. Patent No. 7,689,716 filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011, in 11 pages.
Casey, Realizing Mobile Computing Personae, Ph.D. Thesis, Oct. 1995.
Chapman, Network (In)Security Through IP Packet Filtering, Proceedings of the Third USENIX UNIX Security Symposium, Sep. 1992.
Check Point Ad, Sep. 14, 1998.
Check Point FireWall-I White Paper, v.3, Jun. 1997.
Check Point Software Delivers Breakthrough Security Advancements with Firewall-1 3.0, Oct. 7, 1996.
Check Point SoftwareCheck Point Firewall-I 4.0 Gains Int'l Recognized ITSEC Security Cert., Nov. 9, 1998.
Cheshire, Internet Mobility 4x4, Mobility: Processes, Computers, and Agents, SIGCOMM '96, Aug. 30, 1996.
Cheswick, The Design of a Secure Internet Gateway, Apr. 20, 1990.
Chikarmane, Multicast Support for Mobile Hosts Using Mobile IP, May 16, 1997.
Chikarmane, Network Support for Mobile Hosts in a TCP/IP internetwork, Aug. 1995.
Cho, An Efficient Location and Routing Scheme for Mobile Computing Environments, IEEE Journal on Selected Areas in Communications, 1995.
Cisco Systems, Inc., LocalDirector Quick Start Guide and User Reference Manual, Version 1.0, Jul. 1996.
Cisco, High-Performance Stateful Firewall Delivers Unparalleled Security, PIX Firewall Data Sheet, 1996.
Cobb, Universal Mobile Addressing, IEEE Workshop on Mobile Computing Systems and Applications, 1994.
Collier, Netlets: The Future of Networking, Apr. 4, 1998.
Comer, An Architecture for a Campus-Scale Wireless Mobile Internet, Purdue University Department of Computer Science Technical Report No. CSD-TR 95-058, Sep. 1995.
Damani, ONE-IP: techniques for Hosting a Service on a Cluster of Machines, Jun. 29, 2004.
Desrosiers, Transparent Access of Remote Resources, IBM Technical Disclosure Bulletin, vol. 27, No. 7B, p. 4230, Dec. 1984.
Devivo, Internet Security Attacks at the Basic Levels, ACP SIGOPS Operating Systems Review, vol. 32, Iss. 2, Apr. 1998.
Duda, Mobile Agent Architecture for Nomadic Computing, International Conference on Computer Communications, Cannes, 1997.
Edell, Demand for Internet Access: What we learn from the INDEX trial, Mar. 13, 1999.
Edell, Internet Demand Experiment: Technology and Market Trial, Ph.D. Thesis, Spring, 2001.
Estrin, Inter-organization networks: implications of access control: requirements for interconnection protocol, ACM SIGCOMM Computer Communication Review, vol. 16, Iss. 3, Aug. 1986.

(56) References Cited

OTHER PUBLICATIONS

Felten, Web Spoofing: An Internet Con Game, Princeton University Technical Report No. 540-96, Feb. 1997.
Fielding, RFC 2068 Hypertext Transfer Protocol HTTP 1.1, Jan. 1997.
Ford, Securing a Mobile Internet, Oct. 7, 1999.
Google Groups: "home network" laptop; Aug. 3, 2004; IP3 002769-70; Newsgroups: comp.sys.sun.admin. Newsgroups: comp.sys.sun.admin.
Google Groups: netswitcher; Aug. 2, 2004; IP3 002516; Newsgroups: comp.os.ms-windows.networking.win95.
Google Groups: network configuration laptop packets; Aug. 2, 2004 IP3 002765-66; Newsgroups: comp.protocols.tcp-ip.
Google Groups: network laptop settings, Jul. 30, 2004; IP# 002467-68; Laptop on Dual Networks; Newsgroups: comp.os.ms-windows.nt.admin.networking.
Google Groups: network settings DHCP mobile, Aug. 3, 2004 IP3 002511-15; Newsgroups: comp.sys.mac.comm.
Google Groups: redirect "login page" Jul. 28, 2004; IP 3 002873-74; Newsgroups: microsoft.public.inetserver.iis.activeserverpages.
Google Groups: View Thread, Aug. 2, 2004, IP3 002505-06; Newsgroups: microsoft, public.win95.networking.
Google Groups: View Thread, Aug. 2, 2004, IP3 002507-10; Newsgroups: comp.os.os2.networking.tcp-ip.
Grant, TACACS+ Protocol Version 1.75 Internet Draft (TACACS+)/RFC1492, Oct. 1996.
Gray, Mobile Agents for Mobile Computing, May 2, 1996.
Guerin, RadioNet Driver Implementation for the Mobile Internet Router, Jun. 1994.
Gupta, A Client Oriented IP Level Redirection, M.S. Thesis, Aug. 1998.
Gupta, Firewall Traversal for Mobile IP, Mar. 17, 1997.
Gupta, Secure and mobile networking, Mobile Networks and Applications, vol. 3, Iss. 4, 1998.
Gupta, Solaris Mobile IP: Design and Implementation, Feb. 17, 1998.
Haas, Mobile-TCP: An Asymmetric Transport, Proceedings of ICC'97—International Conference on Communications, Jun. 1997.
Hance, Product Information—Netswitcher, the ultimate windows network setup utility; IP 3 002517; Netswitcher.TM., Developed and Marketed by: J.W. Hance, 1950-18 E. Greyhound Pass, Suite 305, Carmel, Indiana 46033 USA, Aug. 2, 2004.
Harrison, Mobile Multicaset (MoM) Protocol, Proceedings of the 3rd annual ACM/IEEE international conference on Mobile computing and networking, Sep. 26, 1997.
Heilbronner, S.: "Requirements for Policy-Based Management of Nomadic Computing Infrastructions," Proc. of the Sixth Workshop of the HP Openview University Association (HPOVUA '99), Bologna, Italy, Jun. 1999.
Heilbronner, Nomadic Computing Systems on the Internet—Infrastructure and Management Requirements, Mar. 31, 1997.
Hills, Wireless Data Network Infrastructure at Carnegie Mellon University, Feb. 1996.
Hodes, Composable Ad-hoc Mobile Services for Universal Interaction, Aug. 2, 1997.
Housel, WebExpress: A Client/intercept based system for optimizing Web browsing in a wireless environment, Mobile Networks & Applications, vol. 3, No. 4, Jan. 1999.
Hubbard, Firewalling the Net, BT Technology Journal, vol. 15, Iss. 2, Apr. 1997.
Industry-Leading Internet Access System Now Makes Plug and Play—High-Speed Internet Access for the Road Warrior Easier Than Ever, Jul. 20, 1998.
Inouye, Dynamic Network Reconfiguration Support for Mobile Computers, Proceedings of the 3rd annual ACM/IEEE international conference on Mobile computing and networking, Sep. 26, 1997.
Inouye, Physical Media Independence: System Support for Dynamically Available Network Interfaces, Jan. 20, 1997.
Internet is the Key, as the Integration of Locations and their Information Begins, Nikkei Electronics, Jul. 13, 1998.
Ioannidis, IP-based Protocols for Mobile Internetworking, Proceedings of the Conference on Communications Architecture & Protocols, Sep. 3, 1991.
Ioannidis, Protocols for Supporting Mobile IP Hosts, Jul. 1992.
ipfwadm-2.3.0, source code module ipfwadm.c, Jul. 30, 1996.
IPORT Central Office Solution, Nov. 1998, pp. 1-20.
IPORT Connection Methods and Concepts for IPORT v2.x; Nov. 1998, pp. 1-9.
Jain, PC-notebook based mobile networking: Algorithms, architectures and implementations; 1CC95 vol. 2, Jun. 1995.
Johnson, D. B., "Ubiquitous Mobile Host Internetworking", 0-8186-4000-6/93 1993 IEEE, pp. 85-90.
Johnson, Mobile Host Internetworking Using IP Loose Source Routing, Carnegie Mellon University Technical Report No. CS-93-128, Feb. 1993.
Johnson, Protocols for Adaptive Wireless and Mobile Networking, Feb. 1996.
Johnson, Scalable and robust internetwork routing for mobile hosts, Proceedings of the 14th International Conference on Distributed Computing Systems, Jun. 21, 1994.
Johnson, Scalable Support for Transparent Mobile Host Internetworking, Wireless Networks, vol. 1, Iss. 3, 1995.
Jones, America Online FAQ for Non-Members, USENET News posting Mar. 11, 1995 (retrieved from google.com) 6 pages.
Kalkbrenner, et al., Quality of Service (QoS) in Distributed Hypermedia-Systems, Jul. 1995, IEEE, v 10-8186-7180, pp. 529-534.
Kausar, et al., A Charging Model for Sessions on the Internet, European conference on Multimedia Applications, Services and Techniques, Department of Computer Science, University College London, 1999, pp. 246-261.
Katz, The Bay Area Research Wireless Access Network (BARWAN), Proceedings of the 279 KATZ, The Bay Area Research Wireless Access Network (BARWAN), Proceedings of the 41 st IEEE International Computer Conference, Feb. 25-28, 1996.
Kent et al., RFC 2401—Security Architecture for the Internet Protocol, Network Working Group, Nov. 1998.
Kleinrock, L.: "Nomadicity in the NII", Computer Science Department, UCLA, Los Angeles, CA; Cross-Industry Working Team Papers & Reports, Pub. Date: Jun. 1995.
Kleinrock, L.: "Nomadic Computing", Computer Science Department, UCLA, Los Angeles, CA; Information Network and Data Communication' IFIP/ICCC International Conference on Information Network and Data Communication Pub. Date: Jun. 1996, Trondheim, Norway.
Kleinrock, L.: "Nomadicity: Anytime, Anywhere in a Disconnected World", Computer Science Department, UCLA, Los Angeles, CA; Mobile Network and Applications, Special Issue on Mobile Computing and System Services Pub. Date Dec. 1996, vol. 1, Issue 4.
Kleinrock, L.: "Nomadic Computing—An Opportunity", Computer Science Department, UCLA, Los Angeles, CA; ACM SIGCOMM Computer Communications Review, Pub. Date: Jan. 1995, vol. 25, Issue 1.
Kleinrock, L.: "Nomadic Computing" (Keynote address) *Int'l Conf. on Mobile Computing and Networking*, Nov. 1995, Berkley, California, ACM.
Koblas, Socks, Proceedings of the Third USENIX UNIX Security Symposium (Baltimore, MD: USENIX Association), Sep. 1992.
Korba, Larry, "Security System for Wireless Local Area Networks," Ninth IEEE International Symposium on Personal, Indoor and Mobile Radio Communications, Sep. 8, 1998, pp. 1550-1554.
Kunzinger, Network Layer Mobility: Comparison of CDPD and Mobile-IP, IBM Technical Report 29.2003, 1995.
La Porta, Challenges for nomadic computing: Mobility management and wireless communications, Mobile Networks and Applications, vol. 1, Iss. 1, Aug. 1996.
Lain Langdon, Education for Changing Times—An Online Learning Framework, Oct. 15, 1996.
Lee, Adaptive Network Support for Mobile Multimedia, Proceedings of the 1st annual international conference on Mobile computing and networking, Nov. 13, 1995.

(56) References Cited

OTHER PUBLICATIONS

Lee, Chooi-Tian and J.W. Harris, "Designing a Virtual Access Control Configuration Protocol for Implementation over ISDN and Shared-Media Networks," Proceedings 21st IEEE Conference on Local Computer Networks, Oct. 13, 1996, pp. 116-125.
Leech, RFC 1928; SOCKS Protocol Version 5, Mar. 1996.
Leu, Implementation considerations for Mobile IP, Proceedings of the 21st International Computer Software and Applications Conference, Nov. 11, 1997.
Li and Leung, Supporting Personal Mobility for Nomadic Computing Over the Internet, ACM SIGMOBILE Mobile Computing and Communications Review, Apr. 1997.
Lin, An Architecture for a Campus-Sized Wireless Mobile Network, Ph.D. Thesis, Dec. 1996.
Lioy, Providing TCP-Level Services to Mobile Computers, M.S. Thesis, 1997.
Livingston Enterprises, Inc., ChoiceNet Administrator's Guide, Jan. 1997, Pleasanton, CA, available at http://portmasters.com/tech/docs/pdf/choice.pdf.
Loon, Alleviating the Latency and Bandwidth Problems in WWW Browsing, Proceedings of the USENIX Symposium on Internet Technologies and Systems on USENIX Symposium on Internet Technologies and Systems, Dec. 8, 1997.
MacEachern, D.; Apache/Perl Integration Project; README; 2 pages; <http://svn.apache.org/viewvc/perl/modperl/branches/1.x/README?revision=176423>, Dec. 6, 1997.
Maciel, Dynamic Gateways: a novel approach to improve networking performance and availability on parallel servers, Apr. 21, 1998.
Macker, Mobile Ad Hoc Networking and the IETF, ACM SIGMOBILE Mobile Computing and Communications Review, vol. 3, Iss. 1, Jan. 1999.
Major telecom Company Launches Education Internet Service for Schools, Sep. 20, 1995.
Maltz, David A. and Pravin Bhagwat, "MSOCKS: An Architecture for Transport Layer Mobility," Proceedings of the 17th Annual Joint Conference of the IEEE Computer and Communications Societies (INFOCOM '98), Mar. 29, 1998, pp. 1037-1045.
Moby Dick, The Mobile Digital Companion, LTR 20422, Jul. 1997.
Moore, Campus World, 1998.
Myles, Comparison of Mobile Host Protocols for IP, Apr. 14, 1993.
Mysore, A New Multicasting-based Architecture for Internet Host Mobility, Sep. 26, 1997.
Nelson, Context-Aware and Location Systems, Jan. 1998.
Network Working Group Request for Comments: 1009—Requirements for Internet Gateways (Jun. 1987).
Network Working Group Request for Comments: 1027—Using ARP to Implement Transparent Subnet Gateways (Oct. 1987).
Network Working Group Request for Comments: 1034—Domain Names—Concepts and Facilities (Nov. 1987).
Network Working Group Request for Comments: 1531—Dynamic Host Confirmation Protocol (Oct. 1993).
Network Working Group Request for Comments: 1919—Classical Versus Transparent IP Proxies (Mar. 1996).
Network Working Group Request for Comments: 1945—Hypertext Transfer Protocol—HTTP/1.0 (May 1996).
Network Working Group Request for Comments: 826—Ehternet Address Resolution Protocol (Nov. 1982).
Network Working Group Request for Comments: 894—Standards for Transmission of IP Datagrams Over Ethernet Networks (Apr. 1984).
Network Working Group Request for Comments: 925—Mutli-LAN Address Resolution (Oct. 1984).
Networking Working Group, Radius Accounting, Request for Comments: 2139, Obsoletes: 2059; Category: Informational, C. Rigney, Livingston, Apr. 1997; IP 3 002991-003013.
Neves, Adaptive Recovery for Mobile Environments, Communications of the ACM, vol. 40, Iss. 1, Jan. 1997.
Newman, Flow Labelled IP: A Connectionless Approach to ATM, Proceedings of the Conference on Computer Communications (IEEE Infocom), Mar. 24, 1996.

Peine, An Introduction to Mobile Agent Programming and the Ara System, University of Kaiserslautern Technical Report ZRI-Report 1/97, 1997.
Perkins, C. E. et al.: "DHCP for mobile networking with TCP/IP" Proceeding IEEE International Symposium on Computer and Communications, Jun. 27, 1995, pp. 255-261, XP002132695.
Perkins, "Providing Continuous Network Access to Mobile Hosts Using TCP/IP." Computer Networks and ISDN Systems, Nov. 1993.
Perkins, A Mobile Networking System Based on Internet Protocol (IP) in USENIX Symposium on Mobile and Location-Independent Computing, Aug. 2, 1993.
Perkins, C. E. ED—Insitute of Electrical and Electronics Engineers: "Mobile-AP, AD-HOC Networking, and Nomadicity" Proceedings of the 20th Annual International Computer Software and Applications Conference (COMPSAC). Seoul, Aug. 21-23, 1996, Proceedings of the Annual International Computer Software and Applications Conference (COMPSAC), Los Alamitos, IEEE Comp, vol. CONF. 20, Aug. 21, 1996, pp. 472-476, XO 000684381, ISBN 0-8186-7579-9.
Perkins, Highly Dynamic Destination-Sequenced Distance-Vector Routing (DSDV) for Mobile Computers, ACM SIGCOMM Computer Communication Review, vol. 24, Iss. 4, Oct. 1994.
Perkins, Internet Mobile Host Protocol (IMHP), Jun. 13, 1994.
Perkins, Mobile IP; Communications Magazine, IEEE vol. 35, Issue 5, May 1997.
Perkins, Mobile networking through Mobile IP, IEEE Internet Computing, Jan. 1998.
Perkins, Mobile-IP, AD-HOC Networking, and Nomadicity; Proceedings of the 20th Annual International Computer Software and Applications Conference (COMPSAC), Seoul, Aug. 21, 1996.
Perkins, Mobility Support in IPv6, Proceedings of the 2nd annual international conference on Mobile computing and networking, Nov. 10, 1996.
Perkins, et al., Resource discovery protocol for mobile computing, Mobile Networks and Applications 1 (1996) 447-455.
Pissinou, A middleware-based architecture to support transparent data access by mobile users in heterogeneous environments, Research Issues in Data Engineering, Feb. 28, 2000.
Pitoura, Building Information Systems for Mobile Environments, Proceedings of the third international conference on Information and knowledge management, Nov. 29, 1994.
Pitoura, Dealing with Mobility: Issues and Research Challenges; Purdue University Computer Science Department Technical Report CSD-TR-93-070, Nov. 1993.
Pix, Network Translation Inc., Private Internet Exchange (PIX) Technical White Paper (Network Address Translation and the Private Internet Exchange, 1994.
Polydorou, Performance Analysis and Comparison of Two Wireless Wide Area Networks, Dec. 1996.
Poslad, Software Agents for Future Communication Systems—Chapter 9: Agent-Oriented Middleware for Integrating Customer Network Services, 1999.
Postel, RFC 793, Transmission Control Protocol, Sep. 1981.
Rajagopalan, An Adaptive Location Management Strategy for Mobile IP, Proceedings of the 1st annual international conference on Mobile computing and networking, Nov. 13, 1995.
Rajagopalan, Mobile Internetworking Protocols for Wireless Networks with ATM Backbones, MILCOM '97 Conference Proceedings, Nov. 2, 1997.
Rao, A Proxy-Based Personal Web Archiving Service, ACM SIGOPS Operating Systems Review, Jan. 2001.
Redi, Mobile IP: A Solution for Transparent, Seamless Mobile Computer Communications, Upcoming Trends in Mobile Computing and Communications, Jul. 1998.
Richards, et al., Mapping User Level QOS from a Single Parameter, 1988, pp. 1-15.
Rigney, RFC 2138, Remote Authentication Dial in User Service (RADIUS), Apr. 1997.
Rizzo, A Dynamic Pricing Framework to Support a Scalable, Usage-based Charging Model for Packet-switched Networks, May 7, 1999.

(56) References Cited

OTHER PUBLICATIONS

Robinet, An implementation of a gateway for hierarchically encoded video across ATM and IP networks, Proceedings of the IFIP TC-6 Eigth International Conference on High Performance Networking, Sep. 21, 1998.
Rowe, Reliability of WWW Name Servers, Computer Networks and ISDN Systems, Apr. 1995.
Salifu, Abdul-Mumin, "Detection of Man-in-the-Middle Attack in IEEE 802.11 Networks," M.S. Thesis, Kwame Nkrumah University of Science and Technology, May 2011, 79 pages.
Sato, Yutaka: "Details of Functions of Multi-purpose Proxy Server DeleGate-Access/Route Conrol and Protocol Conversion", Interface vol. 21, No. 9, p. 130-146, Sep. 1995.
Schilit, A System Architecture for Context-Aware Mobile Computing, Ph.D. Thesis, May 1995.
Shamsuddin, Positioning of Wireless Broadband, Jun. 1996.
Short, Joel E.: "Auto-Porting and Rapid Prototyping with Application to Wireless and Nomadic Network Algorithms, A dissertation submitted in partial satisfaction of the requirement for the degree of Doctor of Philosophy in Computer Science," University of California, Los Angeles, Published Oct. 26, 1996; pp. xv, 118-124; Co+B343pyright Jan. 16, 1977.
Short, Mobile Wireless Network System Simulation, Wireless Networks, vol. 1, Iss. 4, Nov. 1995.
Single-User Network Access Security TACACS+ http://www.cisco.com/warp/public/614/7.html IP3 002876-002884; dated Aug. 10, 2005.
Stevens, ARP: Address Resolution Protocol; TCP Illustrated, 1994.
Stevens, R, TCP Connection Handshake, 1994.
Stoll, Frank, "The Need for Decentralization and Privacy in Mobile Communications Networks," Computers & Security vol. 14 iss. 6, 1995, pp. 527-539.
Sudan, Gateway Based Approach for Conducting Multiparty Multimedia Sessions over Heterogeneous Signaling Domains, Proceedings of the INFOCOM '97 Sixteenth Annual Joint Conference of the IEEE Computer and Communications Societies, Apr. 9, 1997.
Tanenbaum, Andrew S.: "Computer Networks", 1996, pp. 420-424, 3rd edition, Prentice Hall of India, New Delhi, India.
Tantawy, Ahmed N. and Martina Zitterbart, "A Scheme for High-Performance LAN Interconnection Across Public MAN's," IEEE Journal on Selected Areas in Communications, vol. 11, No. 8, Oct. 1993, pp. 1133-1144.
Taylor, Internetwork Mobility The CDPD Approach, Jun. 11, 1996.
Teraoka, A Network Architecture Providing Host Migration Transparency, ACM SIGCOMM Computer Communication Review, Sep. 1991.
Teraoka, Host Migration Transparency in IP Networks: The VIP Approach; ACM SIGCOMM Computer Communication Review, vol. 23, Iss. 1, Jan. 1993.
Teraoka, VIP: A Protocol Providing Host Mobility, Communications of the ACM, Aug. 1994.
The 'Security Digest' Archives, TCP-IP Distribution List, Aug. 1994, http://securitydigest.org/tcp-ip/archive/1994/08.
The Independent, Hardware hustle hits the classroom, May 20, 1996.
Thomsen, Mobile Agents—The new paradigm in computing, ICL Systems Journal, vol. 12, Issue 1, pp. 14-40, May 1997.
TIS Firewall Toolkit Overview, Jun. 30, 1994.
Tut Systems Launches Hotel Internet Management System, PublicPort(TM) Latest Addition to Multi-Tenant Unit Product Line Allows Hotel Owners to Use Existing Copper Infrastructure to Provide 'Plug and Play' Internet Services, Jun. 23, 1999.
Varaiya, INDEX Project Proposal—Executive Summary,INDEX Project Report #98-005P, Aug. 6, 1996.
Venema, TCP Wrapper; Network monitoring, access control, and booby traps, Proc. of the Third Usenix UNIX Security Symposium, USENIX Association, Sep. 1992.
Windows History: Windows Desktop Timeline, Jun. 30, 2003, available at http://www.microsoft.com/windows/WinHistoryProGraphic.mspx on Jan. 21, 2010, Microsoft, pp. 1-2.
Xylomenos, IP Multicast for Mobile Hosts, IEEE Communications Magazine, vol. 35, Iss. 1, Jan. 1997.
Yeom, IP Multiplexing by Transparent Port-Address Translator, USENIX Tenth System Administration Conference, Sep. 29, 1996.
Zhao, Flexible Connectivity Management for Mobile Hosts, Stanford University Technical Report No. CSL-TR-97-735, Sep. 1997.
Decision of Rejection, in JP App. No. 2001-533680, Office Action dated Jan. 26, 2010.
Decision of Rejection, in JP App. No. 2001-533680, dated Dec. 14, 2010.
Office Action dated Feb. 15, 2011, JP Patent Application No. 2010-167190.
Extended Search Report dated Oct. 8, 2009, Application No. EP 09005810.8.
Response to Examination Report filed Jun. 7, 2010, Application No. EP 09005810.8.
Office Action dated Apr. 27, 2009, CA Patent Application No. 2,388,623.
Office Action dated Jun. 15, 2010 in CA Patent Application No. 2698604.
Office Action dated Sep. 25, 2009, JP Patent Application No. 2001-533719.
Decision of Rejection in JP Patent Application No. 2001-533719 dated Apr. 6, 2010.
Office Action in U.S. Appl. No. 12/685,585 mailed Nov. 4, 2011.
Office Action in U.S. Appl. No. 12/875,043 mailed Sep. 9, 2011.
Office Action in U.S. Appl. No. 13/244,866 mailed Nov. 18, 2011.
Defendants Supplemental Invalidity Contentions received Dec. 23, 2011.
Aboba, B., 1. Lu, J. Alsop, 1. Ding, W. Wang; Review of Roaming Implementations; Sep. 1997; 35 pages; Network Working Group, Request for Comments 2194.
Ascend Communications and ATCOM/INFO Announce Development Alliance, Jun. 22, 1999, Business Wire.
Ascend Communications Inc., Virtual Private Networks Resource Guide 1997.
Airamo, Virtual Private Networks, Tik-110.501 Seminar on Network Security, Nov. 28, 1997.
Arar, Y., Prepaid Internet Access Cards: Instant ISP, http://www.pcworld.com/article/5045/prepaid_internet_access_cards_instant_isp.html, PC World, Jul. 14, 1997, 2 pages.
ATCOM/INFO and Microsoft Plan Large-Scale Deployment of IPORT for Mid—1998, available at http://www.microsoft.com/presspass/press/1998/mar98/ipttrlpr.mspx.
ATCOM/INFO to Display High-Speed Plug- And-Play Internet Access Software with Microsoft at HITEC, Jul. 22, 1999.
ATCOM/INFO'S IPORT Brings High Speed Internet Access to Hotels in Japan and Mexico; ATCOM and Tut Systems Partner to Expand International Presence of 'Plug and Play' Internet Access, May 11, 1999.
Atkins, Internet Security Professional Reference; IP Spoofing and Sniffing, Ch. 6, 1996.
Atreus Systems Corporations and B2B Connect, In. Partner to Deliver Bundled Broadband Services to Mult-Tenant, High Ri Buildings, Feb. 14, 2000, Business Wire.
Auric Web Systems, InterACS: Internet Access Control System: Solutions for the Internet Service Provider, http://web.archive.org/web/19970708234615/http:/www.auricweb.com/InterACS.html, Jul. 8, 1997, 5 pages.
Auric Web Systems, The Intercard System Prepaid Internet Access Cards, http://web.archive.org/web/19970708234054/http:/www.auricweb.com/Accesscard.html, Auric Web Systems, Jul. 8, 1997, 4 pages.
"Auric Web Systems Unveils Software to Reduce the Operating Costs of Internet Service Providers", http://www.allbusiness.com/technology/software-services-applications-internet/6971623-1.html, AllBusiness, Mar. 25, 1997, 2 pages.
Auric Web Systems, WebGate Card: FAQ, http://web.archive.org/web/19980520083043/http:/www.auricweb.com/faq.html, May 20, 1998, 5 pages.
Barnes, Defense Data Network Usage Accounting Enhancement Approaches, Apr. 1989.

(56) References Cited

OTHER PUBLICATIONS

Beermann, C.; Re: Support for cern like Pass/Fair proxy limits?; 2 pages; available at <http://www.squid-cache.org/mail-archieve/squiq-users/199611/0385.html> (visited Feb. 1, 2005).
Berners-Lee, T. et al.; Hypertext Transfer Protocol—HTTP/1.0; May 1996; 54 pages; Network Working Group, Request for Comments 1945.
Bhagwat, P., Charles Perkins, Satish Tripathi; Network Layer Mobility: An Architecture and Survey, IEEE Personal Communications, vol. 3, iss. 3, pp. 54-64; Jun. 1996.
Bojorquez, Victor, CheckPoint Software Tech. LTD., How to Configure Firewall-1 With Connect Control, Oct. 10, 1999.
Borella et al., IETF Internet-Draft—Distributed Network Address Translation, Internet Engineering Task Force, Oct. 1998.
Braden, et al., "Requirements for Internet Gateways", RFC 1009, Jun. 1987.
Case No. 04CV1485 BTM (POR): *IP3 Networks, Inc. v Nomadix, Inc.*—Jul. 23, 2004 Complaint for: (1) Declaratory Judgment of Patent Non-Infringement and Invalidity of U.S. Patent No. 6,636,894; (2) Declaratory Judgment of Patent Non-Infringement of U.S. Patent No. 6,130,893; (3) Trade Libel; (4) Libel Under Cal. Civ. Code § 45; (5) Unfair Competition Under Cal. Bus. & Prof. Code § 17200, Et Seq.: and (6) Intervention Interference with Prospective Economic Advantage.
Case No. 04CV1485 BTM (POR): *IP3 Networks, Inc. v Nomadix, Inc.*—Sep. 20, 2004 Amended Complaint for: (1) Declaratory Judgment of Patent Non-Infringement and Invalidity of U.S. Patent No. 6,636,894; (2) Declaratory Judgment of Patent Non-Infringement of U.S. Patent No. 6,130,893; (3) Trade Libel; (4) Libel Under Cal. Civ. Code § 45; (5) Unfair Competition Under Cal. Bus. & Prof. Code § 17200, Et Seq.: and (6) Interntion Interference with Prospective Economic Advantage—Demand for Jury Trial.
Case No. 04CV1485 BTM (POR): *IP3 Networks, Inc. v Nomadix, Inc*—Oct. 21, 2004 Answer and Counterclaims of Nomadix, Inc. to the Amended Complaint.
Case No. 04CV1485 BTM (POR): *IP3 Networks, Inc. v Nomadix, Inc.*, Plaintiff/Counter-Defendant IP3 Networks Inc.'s Reply to Defendant Nomadix, Inc.'s Counter-claim, dated Nov. 15, 2004.
Case No. 04CV1485 BTM (POR): *IP3 Networks, Inc. v Nomadix, Inc.*, Plaintiff IP3 Networks Inc.'s Responses to Defendant Nomadix, Inc.'s First Set of Interrogatories (Nos. 1-5).
Case No. 07-1946 GPS (VBK) *Nomadix, Inc. v. Second Rule LLC*, Complaint for Patent Infringement of U.S. Patent No. 6,130,892; 7,088,727; 6,636,894; 6,857,009, and 6,868,399 dated Mar. 23, 2007.
Case No. 07-1946 DDP (VBKx) *Nomadix, Inc. v. Second Rule LLC*, Plaintiffs Reply to Defendant's First Amended Answer and Counterclaims, Demand for Jury Trial, 6 pages; Filed Jul. 31, 2007.
Case No. 07-1946 GPS (VBK) *Nomadix, Inc. v. Second Rule LLC*, Defendant's Initial Disclosure of Prior Art dated Jan. 18, 2008.
Case No. 07-1946 DDP (VBKx) *Nomadix, Inc. v. Second Rule LLC*, Plaintiff Nomadix Inc.'s Proposed Claim Construction Statement, dated May 23, 2008.
Case No. 07-1946 GPS (VBK) *Nomadix, Inc. v.Second Rule LLC*, Second Rule LLC's Response to Nomadix, Inc.'s Proposed Claim Construction Statement dated Jun. 6, 2008.
Case No. 07-1946 DDP (VBKx) *Nomadix, Inc. v. Second Rule LLC*, Proposed Joint Claim Construction Statement dated Jul. 2, 2008.
Case No. 07-1946 DDP (VBKx) *Nomadix, Inc. v. Second Rule LLC*, Defendant's Opening Claim Construction Brief, dated Aug. 4, 2008.
Case No. 07-1946 DDP (VBKx) *Nomadix, Inc. v. Second Rule LLC*, Plaintiffs Opening Claim Construction Brief, Redacted Public Version, dated Aug. 4, 2008.
Case No. 07-1946 DDP (VBKx) *Nomadix, Inc. v. Second Rule LLC*, Declaration of Don P. Foster Re: Second Rule LLC's Reply to Plaintiffs Opening Claim Construction Brief, dated Aug. 22, 2008.
Case No. 07-1946 DDP (VBKx) *Nomadix, Inc. v. Second Rule LLC*, Defendant's Reply to Plaintiffs Opening Claim Construction Brief, dated Aug. 22, 2008.
Case No. 07-1946 DDP (VBKx) *Nomadix, Inc. v. Second Rule LLC*, Reply Claim Construction Brief, dated Aug. 22, 2008.

Case No. 07-1946 DDP (VBKx) *Nomadix, Inc. v. Second Rule LLC*, Declaration of Peter Alexander, Ph.D. In Support of Second Rule, LLC for Partial Summary Judgement dated Sep. 4, 2008.
Case No. 07-1946 DDP (VBKx) *Nomadix, Inc. v. Second Rule LLC*, Notice of Motion and Motion of Second Rule LLCfor Partial Summary Judgment; Sep. 5, 2008.
Case No. 07-1946 DDP (VBKx) *Nomadix, Inc. v. Second Rule LLC*, Declaration of Don P. Foster Re: Motion of Second Rule, LLC for Partial Summary Judgement dated Sep. 5, 2008.
Case No. 07-1946 DDP (VBKx) *Nomadix, Inc. v. Second Rule LLC*, Defendant's Statement of Uncontroverted Facts and Conclusions of Law in Support of Defendant's Partial Summary Judgement dated Sep. 5, 2008.
Case No. 07-1946 DDP (VBKx) *Nomadix, Inc. v. Second Rule LLC*, Memorandum of Law in Support of Motion of Second Ruel, LLC for Partial Summary Judgement dated Sep. 5, 2008.
Case No. 07-1946 DDP (VBKx) *Nomadix, Inc. v. Second Rule LLC*, Claim Construction Order dated Oct. 3, 2008.
Case No. 07-1946 GPS (VBK) *Nomadix, Inc. v. Second Rule LLC*, Expert Report of Peter Alexander, Ph.D.; Oct. 31, 2008.
Case No. CV 09-8441 (C.D. Cal. 2009), *Nomadix, Inc. v. Hewlett-Packard Co.*, Complaint filed Nov. 17, 2009.
Case No. CV 10-0381 (C.D. Cal. 2010), *Nomadix, Inc. v. SolutionInc Technologies Ltd.*, Complaint filed Jan. 19, 2010.
Case No. 2:08-cv-00264-DF-CE, *Linksmart Wireless Technology, LLC, v. T-Mobile USA, Inc., et al.*, Defendants' Patent Local Rule 4-2 Preliminary Constructions and Exrinisic Evidence, filed Jan. 21, 2010.
Case No. 2:08-cv-00264-DF-CE, *Linksmart Wireless Technology, LLC, v. T-Mobile USA, Inc., et al.*, Best Western's Supplemental Claim Construction Brief, filed Apr. 16, 2010.
Case No. 2:08-cv-00264-DF-CE, *Linksmart Wireless Technology, LLC, v. T-Mobile USA, Inc., et al.*, Claim Construction Brief of Defendants, filed Apr. 16, 2010.
Case No. 2:08-cv-00264-DF-CE, *Linksmart Wireless Technology, LLC, v. T-Mobile USA, Inc., et al.*, Declaration of Noah A. Levine in Support of Claim Construction Brief of Defendants' filed Apr. 16, 2010.
Case No. 2:08-cv-00264-DF-CE, *Linksmart Wireless Technology, LLC, v. T-Mobile USA, Inc., et al.*, Defendant Barnes & Noble Booksellers, Inc.'s First Amended Answer to Plaintiffs Complaint, filed Apr. 22, 2010.
Case No. 2:08-cv-00264-DF-CE, *Linksmart Wireless Technology, LLC, v. T-Mobile USA, Inc., et al.*, Defendant Mail Boxes Etc., Inc.'s First Amended Answer to Plaintiffs Complaint, filed Apr. 22, 2010.
Case No. 2:08-cv-00264-DF-CE, *Linksmart Wireless Technology, LLC, v. T-Mobile USA, Inc., et al.*, Defendants' SBC (AT&T), Wayport, McDonalds, Barnes & Noble and Mail Boxes etc Joint Unopposed Motion for Leave to Amend Their Respective First Answers and Counterclaims, filed Apr. 22, 2010.
Case No. 2:08-cv-00264-DF-CE, *Linksmart Wireless Technology, LLC, v. T-Mobile USA, Inc., et al.*, Defendant SBC Internet Services, Inc. D/B/A AT&T Internet Services's ("AT&T") First Amended Answer to Plaintiffs Complaint, Linksmart Wireless Technology, filed Apr. 22, 2010.
Case No. 2:08-cv-00264-DF-CE, *Linksmart Wireless Technology, LLC, v. T-Mobile USA, Inc., et al.*, McDonald's Corp.'s First Amended Answer, Defenses, and Counterclaims to Complaint, filed Apr. 22, 2010.
Case No. 2:08-cv-00264-DF-CE, *Linksmart Wireless Technology, LLC, v. T-Mobile USA, Inc., et al.*, Wayport, Inc.'s First Amended Answer, Defenses, and Counterclaims to Complaint, filed Apr. 22, 2010.
Nomadix, Inc.'s Disclosure of Asserted Claims and Infringement Contentions, *Nomadix, Inc. v. Hewlett-Packard Company et al.*, No. CV09-08441 DDP (VBKx), May 24, 2010.
Defendants' Joint Invalidity Contentions, *Nomadix, Inc. v. Hewlett-Packard Company et al.*, No. CV09-08441 DDP (VBKx), Jul. 1, 2010.
Plaintiffs Preliminary Invalidity Contentions and Accompanying Document Production, *Nomadix, Inc. v. Hewlett-Packard Company et al.*, No. CV09-08441 DDP (VBKx), Jul. 1, 2010.

(56) References Cited

OTHER PUBLICATIONS

Defendants' Supplemental Joint Invalidity Contentions, *Nomadix, Inc. v. Hewlett-Packard Company et al.*, No. CV09-08441 DDP (VBKx), Jul. 15, 2010.
Plaintiffs Preliminary Invalidity Contentions and Accompanying Document Production Regarding U.S. Patent Nos. 6,996,073 and 7,580,316, *Nomadix, Inc. v. Hewlett-Packard Company et al.*, No. CV09-08441 DDP (VBKx), Jul. 15, 2010.
First Claim Construction Order, *Nomadix, Inc. v. Hewlett-Packard Company et al.*, No. CV-09-08441 DDP (VBKx), filed Aug. 31, 2011 in 17 pages.
Second Claim Construction Order, *Nomadix, Inc. v. Hewlett-Packard Company, et al.*, No. CV-09-08441 DDP (VBKx), filed Oct. 24, 2011 in 19 pages.
Chapman, D. B., et al.: "Building Internet Firewalls," O'Reilly & Associates, Inc., 103 Morris Street, Suite A Sebastopol, CA 95472, IP3 002885-002944; dated Sep. 1995.
Chatel, M.: Classical versus Transparent IP Proxies (RFC1919), published as an RFC by ISOC on Mar. 1, 1996.
Chikarmane, V., Rick Bunt, Carey Williamson; Mobile IP-based Multicast as a Service for Mobile Hosts; Proceedings of the 1995 Workshop on Physics and Computer Modeling; Jun. 5-6, 1995.
Cisco, "Single-User Network Access Security TACACS+", Mar. 30, 1995, 9 pages, Cisco White Paper; XP992124521.
Cisco Systems, Inc., Interface Queue Management (white paper); "Online!"; Aug. 3, 1995; 12 pages; INET; XP002210177; available at <URL: http://www.cisco.com/warp/publicI614/16.html> (retrieved on Aug. 16, 2002).
Comer, "Internetworking with TCP/IP vol. 1, Chapter 10, Principles, Protocols, and Architecture," 3rd ed., Prentice Hall 1995.
Copper Mountain Introduces CopperPowered Hotel Initiative to Deliver Cost-effective Always-on or Usage-based Broadband Access to Hotel Guests, Dec. 6, 1999, Business Wire.
Dahm, Redirecting your visitors, May 1999.
Data Communication Over the Telephone Network Procedures for Starting Sessions of Data Transmission Over the General Switched Telephone Network, ITU-T Recommendation V.8, approved on Sep. 20, 1994.
Denning et al., Location-Based Authentication: Grounding Cyberspace for Better Security, copy right 1996, Elsevier Science Ltd., pp. 1-6.
Deering et al., Network Working Group RFC 966—Host Groups: A Multicast Extension to the Internet Protocol, Dec. 1985.
Detailed Scenario for Access VPDN Dial-in Using L2TP; Internet, Online!; XP002175644; URL:www.cisco.com (retrieved on Aug. 22, 2001); 1998; p. 1, figure 4, table 1.
Droms, R., Dynamic Host Configuration Protocol, Oct. 1993, 1 page, Network Working Group, Request for Comments 1541.
Droms, R., Dynamic Host Configuration Protocol, Mar. 1997, 1 page, Network Working Group, Request for Comments 2131.
Edell, R. J. et al., "Billing Using and Pricing for TCP", IEEE Journal on selected areas in communications, US, IEEE Inc. New York, vol. 13, NR . 7, pp. 1162-1175; XP000525655; ISSN: 0733-8716, Apr. 15, 1995.
Egevang, IP Network Address Translator, Network Working Group RFC 1631, pp. 1-10, May 1994.
Elastic Networks Unveils YesWare; Mobility Software Solution Target Visitor-Based Networking; PRNewswire, Apr. 12, 1999.
Elton, Peter: "Linux as a Proxy Server", Linus Journal Archive, vol. 1997, Issue 44 (Dec. 1997) Article 3, ISSN: 1075-3583, ("Eldon07") See http://portal.acm.org/citation.cfm?id=327077.327080.
Eventou, A., Anywhere Online Access, Auric Web Systems find many applications for its WEBGate card that's a prepaid key to Internet, Dec. 22, 1997, 1 page.
Fujino, N. et at, "Mobile information service based on multi-agent architecture", (1997), IEICE Transactions on Communications, JP, Institute of Electronics Information and COMM. ENG. Tokyo, vol. E8C-B, NR. 10, pp. 1401-1406; XP000734533; ISSN: 0916-8516.
Furnell et al., A Security Framework for Online Distance Learning and Training, 1998.

Gao, Q., Anthony Acampora; A Virtual Home Agent Based Route Optimization for Mobile IP; 2000 IEEE Wireless Communications and Networking Conference; pp. 592-596; Sep. 23-28, 2000.
Giovanardi, Transparent Mobile IP: an Approach and Implementation, Global Telecommunications Conference, 1997, Nov. 3, 1997.
Gisle Aas et al., Apache.pm; 18 pages; available at <http://www.apache.org/docs>, last modified Mon Apr. 18, 2011 (http://apache.perl.org/).
Heberlein, Attack Class: Address Spoofing, Proceedings of the Nineteenth National Information Systems Security Conference, Oct. 1996.
Heilbronner. S., Requirements for Policy-Based Management of Nomadic Computing Infrastructures; 1998; 14 pages.
Hinrichs, Susan: "Policy-Based Management Bridiging the Gap", Dec. 6, 1999; pp. 209-218; Computer Security Applications Conference, 1999 (ACSAC 1999), Proceedings, 15th Annual Phoenix, Arizona, USA Dec. 6110, 1999, Los Alamitos, California, IEEE Comput. Soc.; XP010368586.
Hluchyj, M. G. et al., Queueing Disciplines for Integrated Fast Packet Networks, IEEE 1992, 7 pages.
Hornig, C.; A Standard for the Transmission of IP Datagrams over Ethernet Networks; Apr. 1984; 3 pages; Network Working Group, Request for Comments 894.
Hotel Online Special Report, Internet Access for the Road Warrior Easier Than Ever IPORT Version 2.0 Released, available at http://www.hotel-online.com/News/PressReleases1998 3rd/July98 IPORTAccess.html, dated Nov. 14, 2007, 2 pages.
Hotelier, ATCOM/INFO Makes High-Speed Internet Access to Corporate Networks Secure for Business Travelers, Jul. 17, 1999.
How to Determine the Version of Windows 95/98/Me in Use, http://support.microsoft.com/kb/158238, Jan. 21, 2010.
Information Sciences Institute; Internet Protocol, DARPA Internet Program, Protocol Specification; Sep. 1981; 45 pages; available at <http://www.faqs.org/rfcs/rfc791.html> (visited Feb. 1, 2005).
Internet Access: ATCOM/INFO Releases IPORT Central Office Solution. IPORT-CO Makes Plug & Play High-Speed Internet Access Possible too Multiple Properties from a Single Server-Product Announcement, ATCOM-IPORT Press Release Oct. 26, 1998.
Internet Technologies Handbook, Chapter 15, Dial-up Technology, Cisco Systems, Indianapolis: Cisco Press, 1998.
Kaashoek et al., Efficient Reliable Group Communication for Distributed Systems, Jul. 1992.
Kostick, Building a Linux Firewall (Linux Journal 24), Apr. 1, 1996.
Kostick, C.: "IP Masquerading with Linux", Linux Journal Issue 27, Jul. 1996 ("Kostic96") See http://delivery.acm.org/10.1145/330000/325560/a3-kostick.html?key1=325560&key2=59 . . . Oct. 16, 2008.
Kostick, "System Administration, IP Masquerading Code Follow-up, vol. 1997, Iss. 43, Nov. 1997 (This is a follow-up article to the author's 'IP Masquerading with Linux', in Linux Journal Issue 27)".
Kruus, Peter S., A Survey of Multicast Security Issues and Architectures, 1998.
Kuri, Jurgen, Gruppenreise Ins Internet Gemeinsamer Internet—Zugang durch das LAN, 1998.
Layer 2 Tunneling Protocol; Internet, Online!; XP002175644; Retrieved from the Internet: URL:www.cisco.com (retrieved on Aug. 22, 2001); 1998; Cisco Systems, Inc.
Lear, RFC 1627, Network 10 Considered Harmful, Jul. 1994.
Levene, Mark and Loizou, George, A Guided Tour of Relational Databases and Beyond, Springer-Verlag London Limited, Great Britain, 1999.
Leveridge, Campus World and BT's On-Line Education Services, BT Technology Journal, Apr. 1997.
Liu, D.: "Automatically Configure a System to Route Internet Traffic to a Proxy," originally disclosed y IBM on Apr. 1, 1999 UTC, RD v42 n420 04-99 article 42099.
Lo et al., IETF Internet-Draft—Realm Specific IP: A Framework, Internet Engineering Task Force, Feb. 1999.
Loeb, S.: "Interactive Billing for Broadband and Multimedia Services," Community Networking, 1995. Pub. Date: Jun. 20-22, 1995, Princeton, NJ.
Luotonen. A. et al.; World-Wide Web Proxies; Apr. 1994; 8 pages.

(56) References Cited

OTHER PUBLICATIONS

Make users go thru login, Available at http://www.microsoft.public. inetserver.iis.activeserverpages.html(visited Oct. 5, 2005 but including items dated Jan. 19, 1998).
Making the Most of Home pp., E-mail, The Internet and Presentation Graphics, The Journal, Aug. 1, 1998.
Malkin, G.; Dial-in Virtual Private Networks Using Layer 3 Tunneling; Proceedings of the Conference on Local Computer Networks, XX, XX; Nov. 2, 1997; pp. 555-561; XP002084438.
Manuel Gunter, Virtual Private Networks over the Internet, Aug. 3, 1998.
Maruyama et al, "A secure LAN sockets system for everyone which need not modify existing DHCP clients", Study Report of Information Processing Society of Japan, Jul. 16, 1999, vol. 99, No. 56, pp. 131-136.
McKinley, R., Prepaid Internet Access Cards, http://www.cardtrak. com/news/1997/07/14/prepaid_internet_access_cards, CardTrak. com, Jul. 14, 1997, 1 page.
Messmer, "Gateway Handles Thorny Problems with Addressing IP Networks", Network World, p. No. 8, Nov. 28, 1994.
Messmer, New room-service fare: High-speed Internet access, Dec. 7, 1998.
Metz, C.: "AAA Protocols; Authentication, Authorization, and Accounting for the Internet," Internet Computing, IEEE, vol. 3, No. 6, pp. 75-79, Nov./Dec. 1999.
Michard, A. et al.; The Aquare/Ie resource discovery system; Computer Networks and ISDN Systems; 1998; pp. 1185-1200; vol. 30, NR. 13; North Holland Publishing; Amsterdam, NL; XP004147404; ISSN: 0169-7552.
Microsoft TechNet: Dial-Up Networking and Mobile Computing: The Basics, http://technet.microsoft.com/en-us/library/cc751107, 2010.
Microsoft WindowsNT ResourceKit, Version 4.0, Supplement One, Microsoft Press, 1997.
Microsoft WindowsNT Workstation ResourceKit: Comprehensive Resource Guide and Utilities for Windows NT Workstation Version 4.0, Microsoft Press, 1996.
Microsoft Computer Dictionary, Fourth Edition, Microsoft Press, 1999.
Mockapetris, P.; Domain Names—Concepts and Facilities; Nov. 1987; 49 pages; Network Working Group, Request for Comments 1034.
Mod . . . perl.c; Copyright;1995-1997 The Apache Group; 20 pages.
Mogul, RFC 950; Internet Standard Subnetting Procedure, Network Working Group, Aug. 1985.
NetGame Ltd. Announces its High-Speed, In-Room Hotel Internet Access Product to be Displayed at HITEC 99, Jun. 16, 1999, Business Wire.
Newton, Harry, Newton's Telecom Dictionary, p. 206, Telecom Books and Flatiron Publishing, Miller Freeman, Inc., New York, NY, 1998.
Nomadix Joins Copper Mountain Networks to Provide High-Speed Internet Access to Hotels Guests, Dec. 6, 1999, Business Wire.
Perkins, C.E., et al.: "A Mobile Networking System Based on Internet Protocol", Pers+B296onal Communications, IEEE< Pub. Date: 1st Qtr 1994, vol. 1, Issue 1.
Perkins, RFC 2002: IP Mobility Support, Oct. 1996.
Person, et al., Using Windows 95, Platinum Edition, pp. 205-209,812-813, Que Corporation, 1996.
Pix, Network Translation Inc., Private Internet Exchange (PIX) Technical White Paper, May 16, 1995.
Pix, Network Translation Inc., Private Internet Exchange Reference Manual, Oct. 5, 1995.
Plummer, D., An Ethernet Address Resolution Protocol or Converting Network Protocol Addresses to 48.bit Ethernet Address for Transmission on Ethernet Hardware; Nov. 1982; 8 pages; Network Working Group, Request for Comments 826.
Postel, J.; Multi-Lan Address Resolution; Oct. 1984; 14 pages; Network Working Group, Request for Comments 925.

Rao, A Proxy-Based Personal Portal, Proceedings of the WebNet99 Conference, Hawaii, Oct. 1999, p. 913.
Rao, iProxy: A Programmable Proxy Server, Poster Proceedings of the WebNet99 Conference, Oct. 1999, p. 1676.
Rekhter, RFC 1597, Address Allocation for Private Internets, Mar. 1994.
Rekhter, RFC 1918, Address Allocation for Private Internets, Feb. 1996.
Rigney, C., Radius Accounting, Network Working Group, Request for Comments: 2139, Apr. 1997.
Rigney, RFC 2058, Remote Authentication Dial in User Service (RADIUS), Jan. 1997.
Rigney, RFC 2059, RADIUS Accounting, Jan. 1997.
Rupp, Index: A Platform for Determining how People Value the Quality of their Internet Access, INDEX Project Report #98-010P, May 1998.
Sandhu et al., Decentralized Group Hierarchies in UNIX: An Experiment and Lessons Learned, Oct. 1998.
Scale, How to Cost-Effectively Scale Web Servers, Packet Magazine, Third Quarter, 1996.
Schoen, et al., "Convergence Between Public Switching and the Internet", published Sep. 21, 1997 in World Telecom Congress Proceedings, pp. 549-560.
Schooler, A Distributed Architecture for Multimedia Conference Control, Nov. 1991.
Shreedhar, M. et al.; Efficient Fair Queuing Using Deficit Round Robin; Proceedings of the International Workshop on Community Networking; XX, XX, Aug. 1, 1995; pp. 231-242; XP000541659.
Sietmann, R.; "Tatifmodelle gegen staus auf der infobahn", (Apr. 1998). Funkschau, DE, Franzis-Verlag K. G. Munchen, vol. 71, Nr. 8 pp. 28-30; XP000779238; ISSN: 0016-2841.
Simpson and Weiner, The Oxford English Dictionary, 2nd Edition, vol. III, pp. 514-515, Oxford University Press, 1989.
Simpson and Weiner, The Oxford English Dictionary, 2nd Edition, vol. VII, p. 881, Oxford University Press, 1989.
Smith, M. et al., Network Security Using NAT and NAPT; Aug. 2002; pp. 355-360; 10th IEEE International Conference; XP-002246149.
Smoot, Carl-Mitchell, et al., "Using ARP to Implement Transparent Subnet Gateways", RFC 1027, Oct. 1987.
Srisuresh et al., RFC 2663—IP Network Address Translator (NAT) Terminology and Considerations, Network Working Group, Aug. 1999.
Srisuresh, P. et al., TraditionalIP Network Address Translator (Traditional NA 7); Jan. 2001; 16 pages; The Internet Society; XP 002227044.
Stevens, W. R.; TCP/IP Illustrated, vol. 1—The Protocols; Addison-Wesley Professional Computing Series; pp. 53-62 and 231-235 (Printed Jul. 2001).
Stewart, J. N., Working with Proxy Servers; Mar. 1997; pp. 19-22; WebServer Magazine.
Team Internet Technical Specifications, Infomine Network Solutions and Services, Helena, Montana, Sep. 7, 1998.
Tennenhouse, D. L., Jonathan M. Smith, W. David Sincoskie, David 1. Wetherall, Gary J. Minden; A Survey of Active Network Research; IEEE Communications Magazine; Jan. 1997; pp. 80-86; IEEE.
Troy, Timothy N., "Servicing with Software," Hotel & Motel Management, Sep. 20, 1993, p. 28, vol. 208, No. 16, Advanstar Communications, Inc.
Tsuchiya et al., Extending the IP Internet Through Address Reuse, ACM SIGCOMM Computer Communication Review, 1993.
Universal Subscriber Gateway, Nomadix, Inc. 2701 Ocean Park Blvd., Suite 231, Santa Monica, California 90405; 1999.
USG Product Timeline, Nomadix, Inc. 2701 Ocean Park Blvd., Suite 231, Santa Monica, California 90405; 1999.
Valencia, RFC 2341, Cisco Layer Two Forwarding (Protocol) "L2F", May 1998.
Wahl, RFC 2256, A Summary of the X.500(96) User Schema for use with LDAPv3, Dec. 1997.
Webb, Automatic Redirection, Jun. 8, 1997.
Wessels, D.; Squid Proxy Server Configuration File 1.93.2.2, "TAG deny_info"; Mar. 1997; 19 pages; available at <http://www.squid-cache.org/mail-archieve/squid-users/199703/att0250/squid.conf> ; (visited Feb. 1, 2005).

(56) References Cited

OTHER PUBLICATIONS

Yang, C., Jiing-Ching Yang, Kun-Da Wu, Jian-Xing Lee, Yuh-Rong Leu; An Efficient Multicast Delivery Scheme to Support Mobile IP; Proceedings of the 10th International Workshop on Database and Expert Systems Applications; 1999; 6 pages; IEEE Computer Society, Washington DC.
Yokoi, T. et al., Internet Quality & Traffic Management (III), The Journal of the Institute of Electronics, Information and Communication Engineers, 2000, Jan. 2005, vol. 83, No. 1, pp. 57-63.
U.S. Appl. No. 60/072,175 by Brothers, filed Jan. 22, 1998.
U.S. Appl. No. 60/084,014, filed May 4, 1998; In re: Ikudome; entitled "User Specific Automatic Web Redirection System".
U.S. Appl. No. 09/295,966 filed Apr. 21, 1999.
U.S. Appl. No. 10/919,214, filed Aug. 16, 2004—file history of U.S. Publication No. 2005-0021943, published Jan. 27, 2005.
U.S. Appl. No. 11/645,924, filed Dec. 26, 2006—file history of U.S. Publication No. 2007-0294417, published Dec. 20, 2007.
U.S. Appl. No. 11/375,740, filed Mar. 14, 2006—file history of U.S. Publication No. 2006-0174019, published Aug. 3, 2006.
U.S. Appl. No. 08/816,174, filed Mar. 12, 1997.
U.S. Reexam: Supplemental Information Disclosure Statement submitted on May 13, 2010 in U.S. Patent Rexamination Proceeding: 90/009,301, filed Dec. 17, 2008.
International Search Report dated Mar. 14, 2001 relating to PCT/US 00/29172 in 2 pages.
International Search Report dated Jun. 15, 2001 for International Application No. PCT/US 00 28541, filed Oct. 16, 2000; Applicant—Nomadix, Inc., et al.
Appenzeller, et al., "User-Friendly Access Control for Public Network Ports," Department of Computer Science, Stanford University, dated Aug. 31, 1998 in 16 pages.
Braden, B. Et al., RFC2309 *Recommendations on Queue Management and Congestions Avoidance in the Internet*; Apr. 1998; 13 page; "Online!" IETF, INET XP002210176; available at <URL: http://www.faqs.org/rfcs/rfc2309.html> (retrieved on Aug. 16, 2002).
Complaint, Demand for Jury Trial; *IP3 Networks, Inc.* vs. *Nomadix. Inc*; Case No. 04CV1485 DMS (POR); 45 pages, Filed Jul. 23, 2004; United States District Court. Southern District of California.
Case No. 04 CV 1485 DMS (POR): *IP3 Networks, Inc.* vs. *Nomadix. Inc.*; Amended Complaint, Demand for Jury Trial; 48 pages; Sep. 20, 2004; United States District Court, Southern Distrcik of California.
Case No. 04 CV 1485 DMS (POR): *IP3 Networks, Inc.* vs. *Nomadix. Inc.*; Answer and Counterclaims of Nomadix Inc. to the Amended Complaint; 44 pages, Filed Oct. 21, 2004; United States District Court, Southern District of California.
Case No. 04CV1485 DMS (POR): *IP3 Networks, Inc.* vs. *Nomadix. Inc.*; Plaintiff/CounterDefendant IP3 Networks Inc.'s Reply to Defendant Nomadix, Inc.'s Counterclaim; 8 pages; Nov. 15, 2004; United States District Court, Southern District of California.
Case No. 04CV1485 DMS (POR): *IP3 Networks, Inc.* vs. *Nomadix. Inc.*; Plaintiff Reply to Counterclaims of Nomadix Inc. to the Amended Complaint, Demand for Jury Trial; 8 pages; Filed Nov. 15, 2004; US District Court, Southern District of California.
Case No. CV 09-8441 (C.D. Cal. 2009), *Nomadix, Inc.* v. *Hewlett-Packard Co.*, Invalidity Expert Report of Kevin Jeffay, Ph.D. (redacted), Jan. 31, 2012.
Case No. CV 09-8441 (C.D. Cal. 2009), *Nomadix, Inc.* v. *Hewlett-Packard Co.*, Expert Report of Stuart G. Stubblebine, Ph.D. Regarding Validity of Nomadix, Inc.'s Patents (redacted), Mar. 19, 2012.
Case No. CV 09-8441 (C.D. Cal. 2009), *Nomadix, Inc.* v. *Hewlett-Packard Co.*, Defendant Hewlett-Packard Company's Memorandum of Contentions of Fact and Law, filed May 29, 2012.
Case No. CV 09-8441 (C.D. Cal. 2009), *Nomadix, Inc.* v. *Hewlett-Packard Co.*, Nomadix, Inc.'s Memorandum of Contentions of Fact and Law, filed May 29, 2012.
Ex Parte Reexamination Certificate for U.S. Pat. No. 6,779,118 C1 (8926th), for User Specific Automatic Data Redirection System, Mar. 27, 2012.
U.S. Appl. No. 60/111,497 by Kleinrock, filed Dec. 8, 1998.
Decision in Request for Reexamination of U.S. Pat. No. 6,636,894, filed Nov. 18, 2011, Control No. 95/001,831, mailed Dec. 20, 2011, 19 pages.
Decision on Petition under 37 C.F.R. § 1.181 and 1.927, Control No. 95/001,831, mailed Feb. 28, 2012, 15 pages.
Comments on the Denial of Petition under 37 C.F.R. §§ 1.181 and 1.927 for Review of the Examiner's Order Denying Inter Partes Reexamination, in Proceeding No. 95/001,831, for U.S. Pat. No. 6,636,894, dated Jun. 26, 2012.
U.S. Appl. No. 09/458,602, filed Dec. 8, 1999.
Office Action in U.S. Appl. No. 09/458,602 mailed Aug. 26, 2011.
Decision for Granting Request for Prioritized Examination in U.S. Appl. No. 12/685,585 mailed Jun. 12, 2012.
Office Action in U.S. Appl. No. 12/875,043 mailed Dec. 21, 2011.
Office Action in Canadian Application No. 2725720 mailed Apr. 30, 2013.
Decision on Appeal in JP App. No. 2001-533680, dated Aug. 7, 2012.
Office Action dated Jul. 18, 2012 in CA Patent Application No. 2698604.
Preliminary Report of Inquiry Letter in JP Patent Application No. 2001-533719 dated Dec. 26, 2011.
Notice of Allowance in JP Application No. 2001-533719 entitled "Systems and Methods for Redirecting Users Attempting to Access a Network Site," mailed Jun. 19, 2012.

\* cited by examiner

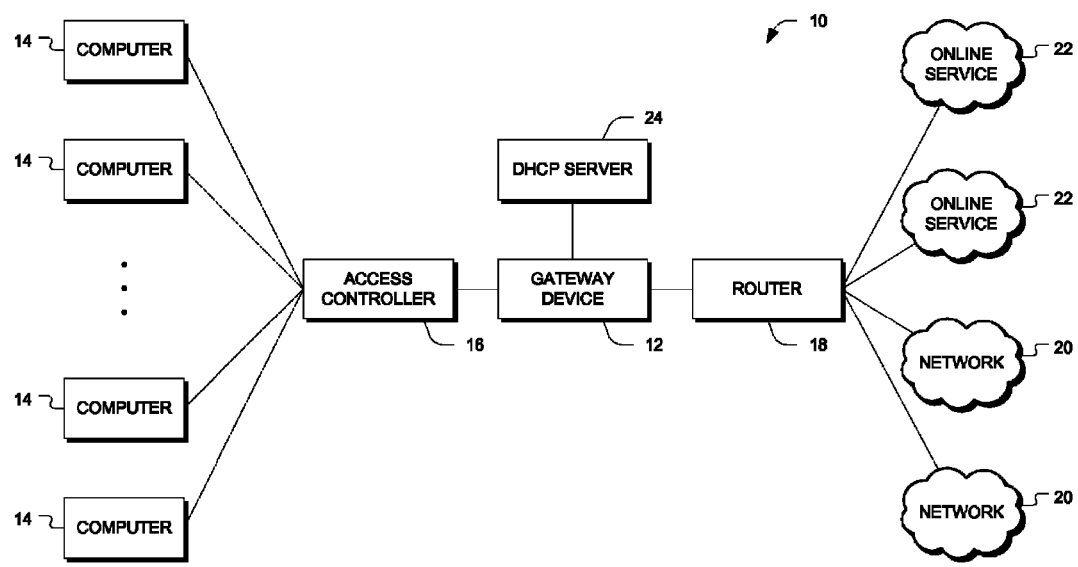

SYSTEM AND METHOD FOR AUTHORIZING A PORTABLE COMMUNICATION DEVICE

CROSS-REFERENCE TO RELATED APPLICATIONS

This application is a continuation of U.S. patent application Ser. No. 09/458,602, filed Dec. 8, 1999, which claims priority from U.S. Provisional Patent Application Ser. No. 60/111,497. The contents of all of the aforementioned applications are hereby incorporated by reference as if set forth in their entireties herein.

BACKGROUND

1. Field of the Invention

The present invention relates generally to a gateway device and, more particularly, to a universal network gateway for enabling a computer to transparently access and communicate with a service provider network.

2. Description of the Related Art

In order for a computer to function properly in a network environment, the computer must be appropriately configured. Among other things, this configuration process establishes the protocol and other parameters by which the computer transmits and receives data. In one common example, a plurality of computers are networked to create a local area network (LAN). In the LAN, each computer must be appropriately configured in order to exchange data over the network. Since most networks are customized to meet a unique set of requirements, computers that are part of different networks are generally configured in different manners in order to appropriately communicate with their respective networks.

While desktop computers generally remain a part the same network for a substantial period of time, laptops, handhelds, personal digital assistants (PDAs), cellphones or other portable computers (collectively "portable computers") are specifically designed to be transportable. As such, portable computers are connected to different networks at different times depending upon the location of the computer. In a common example in which the portable computer serves as an employee's desktop computer, the portable computer is configured to communicate with their employer's network, i.e., the enterprise network. When the employee travels, however, the portable computer may be connected to different networks that communicate in different manners. In this regard, the employee may connect the portable computer to the network maintained by an airport, a hotel, a cellular telephone network operator or any other locale in order to access the enterprise network, the Internet or some other on-line service. The portable computer is also commonly brought to the employee's residence where it is used to access various networks, such as, the enterprise network, a home network, the Internet and the like. Since these other networks are configured somewhat differently, however, the portable computer must also be reconfigured in order to properly communicate with these other networks. Typically, this configuration is performed by the user each time that the portable computer is connected to a different network. As will be apparent, this repeated reconfiguration of the portable computer is not only quite time consuming, but is also prone to errors. The reconfiguration procedure may even be beyond the capabilities of many users or in violation of their employer's IT policy. Accordingly, special software must also typically be loaded onto the user's computer to support reconfiguration.

As described by U.S. patent application Ser. No. 08/816, 174 and U.S. Provisional Patent Application Nos. 60/111, 497, 60/160,973, 60/161,189, 60/161,139, 60/160,890 and 60/161,182, a universal subscriber gateway device has been developed by Nomadix, Inc. of Westlake Village, Calif. The contents of these applications are incorporated herein by reference. The gateway device serves as an interface connecting the user to a number of networks or other online services. For example, the gateway device can serve as a gateway to the Internet, the enterprise network, or other networks and/or on-line services. In addition to serving as a gateway, the gateway device automatically adapts to a computer, in order that it may communicate with the new network in a manner that is transparent both to the user and the new network. Once the gateway device has appropriately adapted to the user's computer, the computer can appropriately communicate via the new network, such as the network at a hotel, at home, at an airport, or any other location, in order to access other networks, such as the enterprise network, or other online services, such as the Internet.

The portable computer user, and more specifically the remote or laptop user, benefits from being able to access a myriad of computer networks without having to undergo the time-consuming and all-too-often daunting task of reconfiguring their host computer in accordance with network specific configurations. In addition, no additional software need be loaded onto the computer prior to connection to the other network. From another perspective, the network service provider benefits from avoiding "on-site" visits and/or technical support calls from the user who is unable to properly re-configure the portable computer. In this fashion, the gateway device is capable of providing more efficient network access and network maintenance to the user and the network operator.

Gateway devices are typically used to provide network access to the remote portable computer user, such as users in hotels, airports and other locations where the remote portable computer user may reside. Additionally, gateway devices have found wide-spread use in multi-resident dwellings as a means of providing the residents an intranet that networks the residents, broadband Internet access and the capability to adapt to the variances of the resident's individual enterprise networks. With the advent of even smaller portable computing devices, such as handhelds, PDAs, and the like, the locations where these users may reside becomes almost limitless.

User access to computer networks has been traditionally based upon the identity of the computer or computer user rather than the location of the accessing computer. For example, in conventional dial up modem access to computer networks, such as the Internet, a user must typically enter identification information such as the user's name and password. This user input information is then compared to a database of user profiles to determine if the user should be granted access. The database may also indicate the type of access and other related information, such as fees due. For example, where a subscriber to an Internet Service Provider (ISP) has purchased Internet access, a user profile database may contain information which not only enables the user to be authenticated, but tracks the user's access for accounting purposes, such as maintaining a history of the user's access time on the network.

However, where the location-based access is established, access to the network cannot be based upon an individual user or computer, as multiple persons can obtain access from a given location, possibly utilizing different computers. Moreover, requiring each user to enter identification information for access overrides any convenience offered by simple, transparent location-based access to computer networks. Transparent network access is also impeded where access is not based upon location-based identification, but rather based upon user input identification information, where the gateway device enables a user to access networks based upon the user's computer settings. For instance, if a user's computer is configured to access a home network, identifying the computer may require the computer to be reconfigured.

Typical network access servers typically allow access to a server based upon a user's information, such as a user name. Authentication was typically done via a user name and password, which is an all or nothing approach. In other words, a user is either allowed access or denied access to a network. Therefore, users cannot be dynamically authorized access to a network such that the user's access and authorization to particular networks or sites can be determined and varied based upon attributes associated with the user, user's location, or packets received from the user's computer.

What is needed is an AAA method and system that allows users dynamic access based upon any number of variables, such as a user's location, a user name or password, a user's location. It would be advantageous for a user to be authorized access based on these variables. Furthermore, it would be advantageous for users to have flexible access to particular sites or services based upon these attributes. Therefore, an ISP or enterprise network can selectively permit access to users, and permit the user.

Therefore, an Authentication, Authorization and Accounting method and system would be desirable which enables a user transparent access to a computer network employing a gateway device, where the computer network can dynamically and selectively authorize a network access. Furthermore, authentication and access rights can be transparently based upon the location from which access is requested, or based upon another attribute associated with the user's computer so that the user is not required to be queried for information and no additional configuration software need be loaded on the user's computer. Moreover, if the user is queried for access information, the user's data should be stored such that subsequent attempts to access the network do not require the user to establish authorization.

SUMMARY

The present invention comprises a method and system for selectively implementing and enforcing Authentication, Authorization and Accounting (AAA). The authentication capability can be based upon multiple methods. First, AAA can be done based upon where the traffic is originating, such as a location, computer, circuit, or user. Secondly, the authentication and authorization capability can be based upon the type of services the user is attempting to access, such as a destination address. This can be a destination port or Internet address, a TCP port, a network. Third, AAA can be based upon the content type or protocol being transmitted. For example, each packet can be filtered through the selective AAA process, so that a user can be authorized access to a particular location. Each time the user attempts to access a different location, the user is subject to the AAA, so the user may be prevented access from a particular site the AAA method deems inaccessible to the user based upon the user's authorization. Alternatively, the AAA method according to the present invention allows users to connect directly to a specific site, such as credit card or billing servers which collect billing information, which can indicate that the user has paid, so that the user is thereafter authorized access to networks. Additionally, a user's authorization can depend upon a specific time, so that the user can be kicked off a network at a specific time, after a specific time has elapsed, or according to other dynamic information determined by the network provider.

According to one embodiment of the invention, a method for transparently authorizing, authenticating and accounting users having access to a destination network is disclosed, wherein the users otherwise have access to a home network through home network settings resident on the users' computers, and wherein the users can access the destination network without altering the home network settings. The method includes receiving at a gateway device a request from a user for access to the destination network and identifying an attribute associated with the user based upon a packet received by the gateway device, wherein the packet is transmitted from the user's computer, wherein the user computer remains configured for accessing the home network, and wherein no additional configuration software need be installed on the user computer. The method also includes accessing a user profile corresponding to the user and stored in a user profile database, where the user profile is accessed based upon the attribute associated with the user, and determining if the user is entitled to access the destination network based upon the user profile.

According to one aspect of the invention, a location identifier is assigned to the location from which the request for access to the destination network is transmitted, where the location identifier is the attribute associated with the user. Thus, the packets received by the gateway device indicate the locations from which the requests were transmitted. The location identifier may be a virtual local area network (VLAN) ID assigned to the location from which the request for access was transmitted.

Furthermore, according to one aspect of the method of the present invention, the user profile database can be updated when new users access the destination network such that the user can be quickly authorized access once identified by a user name or password. Additionally, a historical log of user access to the destination network may be maintained in respective user profiles so that the system can accurately bill users for access to the destination network.

According to the method of the present invention, determining if the user is entitled to access the destination network can include denying the user access where the user's profile indicates that the user is denied access. However, the user may be directed to a login page in instances which the user's profile is not located within the user profile database.

According to another embodiment of the invention, a system for authorizing, authenticating and accounting users having transparent access to a destination network is disclosed, where the users otherwise have access to a home network through home network settings resident on the users' computers, and wherein the users can access the destination network without altering the home network settings. The system includes a gateway device for receiving a request from a user for access to the destination network, and means for identifying an attribute associated with the user based upon a packet received by the gateway device, wherein the packet is transmitted from the user's computer, wherein the user's computer is configured for accessing the home network, and wherein no additional configuration software need be installed on the user computer. The system also includes a user profile database comprising stored access information that is in communication with the gateway device, wherein access information corresponding to the user is identified by the attribute associated with the user, and an Authentication, Authorization and Accounting (AAA) server in communication with the gateway device and user profile database, where the AAA server determines if user is entitled to access the destination network based upon the access information stored within the user profile database.

According to one aspect of the invention, the means for identifying can be provided by an access concentrator in communication with the gateway device. Furthermore, the packet transmitted to the gateway device can include a VLAN ID, a circuit ID, or a media access control (MAC) address for identifying the location from which the request for access was transmitted.

The user profile database includes a plurality of user profiles, wherein each respective user profile of the plurality of user profiles contains access information, and where each respective user profile contains historical data relating to the duration of destination network access for use in determining the charges due for the destination network access. Additionally, the user profile database can be located within the AAA server. The AAA server, can, in turn, be located within the gateway device.

The Authentication, Authorization and Accounting method and system according to the present invention enables users transparent access to a computer network employing a gateway device, where the computer network can authenticate and authorize access rights based upon the location from which access is requested, or based upon another attribute associated with the user in a manner transparent to the user. In this regard, the method and system of the present invention permit Authentication, Authorization and Accounting without requiring the user to reconfigure their computer and without requiring additional configuration software to be loaded upon the user's computer.

BRIEF DESCRIPTION OF THE DRAWINGS

FIG. 1 is a block diagram of a computer system that includes a gateway device for automatically configuring one or more computers to communicate via the gateway device with other networks or other online services, according to one embodiment of the present invention.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, a computer system 10 including a gateway device 12 is depicted in block diagram form. The computer system 10 typically includes a plurality of computers 14 that access a computer network in order to gain access to networks 20 or other online services 22. For example, the computers 14 can be plugged into ports that are located in different rooms of a hotel, business, or a multi-dwelling unit. Alternatively, the computers 14 can be plugged into ports in an airport, an arena, or the like. The gateway device 12 provides an interface between the plurality of computers 14 and the various networks 20 or other online services 22. One embodiment of a gateway device has been described by the aforementioned U.S. patent application Ser. No. 08/816,174.

Most commonly, the gateway device 12 is located near the computers 14 at a relatively low position in the overall network (i.e., the gateway device 12 will be located within the hotel, multi-unit residence, airport, etc.). However, the gateway device 12 can be located at a higher position in the system by being located closer to the various networks 20 or other online services 22, if so desired. Although the gateway device 12 can be physically embodied in many different fashions, the gateway device 12 typically includes a controller and a memory device in which software is stored that defines the operational characteristics of the gateway device 12. Alternatively, the gateway device 12 can be embedded within another network device, such as an access concentrator 16 or a router 18. For example, the gateway device 12 could be located at a network operating center or could be located before or after a router 18 in the computer network. Moreover, the software that defines the functioning of the gateway device 12 can be stored on a PCMCIA card that can be inserted into a computer of the plurality of computers 14 in order to automatically reconfigure the computer to communicate with a different computer system, such as the networks 20 and online services 22.

The computer system 10 typically includes an access concentrator 16 positioned between the computers 14 and the gateway device 12 for multiplexing the signals received from the plurality of computers onto a link to the gateway device 12. Depending upon the medium by which the computers 14 are connected to the access concentrator, the access concentrator 16 can be configured in different manners. For example, the access concentrator can be a digital subscriber line access multiplexer (DSLAM) for signals transmitted via regular telephone lines, a cable head end for signals transmitted via coaxial cables, a wireless access point (WAP) for signals transmitted via a wireless network, a cable modem termination shelf (CMTS), a switch or the like. As also shown in FIG. 1, the computer system 10 typically includes one or more routers 18 and/or servers (not shown in FIG. 1) to control or direct traffic to and from a plurality of computer networks 20 or other online services 22. While the computer system 10 is depicted to have a single router, the computer system 10 can have a plurality of routers, switches, bridges, or the like that are arranged in some hierarchical fashion in order to appropriately route traffic to and from the various networks 20 or online services 22. In this regard, the gateway device 12 typically establishes a link with one or more routers. The routers, in turn, establish links with the servers of other networks or other online service providers, such as internet service providers, based upon the user's selection. It will be appreciated by one of ordinary skill in the art that one or more devices illustrated in FIG. 1 may be combinable. For example, although not shown, the router 18 may be located entirely within the gateway device 12.

Communication between users and networks or online services may be effectuated through ports, for example, located within hotel rooms or multi-dwelling units, or through conventional dial-up communications, such as through the use of telephone or cable modems. According to one aspect of the invention, users can be/are redirected to portal page, as described below. After being redirected to the portal page, the user is subjected to a AAA process. Based upon the AAA process, the user may be permitted transparent access to the destination network or may be redirected to a login page in order to gather additional information to identify the user.

Identifying the user is crucial in authorizing access to networks or online services, as such services are typically provided for a fee and may be customized based upon the user, user's location, or user's computer. As such, the system of the present invention includes means for identifying a user based upon an attribute associated with the user that is contained within the packet transmitted from the user's computer. Attributes can include information such as the source, destination and type of traffic. In general, identifying a user's computer that accesses the network can be done by a MAC address associated with the user's computer. Identifying a user accessing a network based upon a MAC address is well known to those of skill in the art, and will not be discussed in detail herein. Additionally, the attribute can be based upon a user name and ID, or according to one advantageous embodiment, a particular location, such as from a communications port in a hotel room. Such location-based identification in computer systems employing VLAN tagging and those not employing VLAN tagging according to the present invention will first be described. However, it should be appreciated that location based authorization is just one method of identifying a user which may be authenticated, authorized and accounted according to the present invention. As stated above, a user's computer can be identified based on a MAC address associated with the computer. A user can also be identified based upon a username and password. Additionally, a user can be identified according to a combination of these attributes.

The authentication capability can be based upon multiple methods. First, AAA can be done based upon where the traffic is originating, such as a location, computer, circuit, or user. Secondly, the authentication and authorization capability can be based upon the type of services the user is attempting to access, such as a destination address. This can be a destination port or Internet address, a TCP port, a network. Third, AAA can be based upon the content type or protocol being transmitted. For example, each packet can be filtered through the selective AAA process, so that a user can be authorized access to a particular location. Each time the user attempts to access a different location, the user is subject to the AAA, so the user may be prevented access from a particular site the AAA method deems accessible to the user based upon the user's authorization. Alternatively, the AAA method according to the present invention allows users to connect directly to a specific site, such as credit card or billing servers which collect billing information, which can indicate that the user has paid, so that the user is thereafter authorized access to networks. Additionally, a user's authorization can depend upon a specific time, so that the user can be kicked off a network at a specific time, after a specific time has elapsed, or according to other dynamic information determined by the network provider.

Therefore, AAA can be based upon the source, destination, and type of traffic. Upon receiving a packet, the AAA module will look at various parameters such as the link layer information, such as the circuit, source MAC address, VLAN tag, circuit ID, along with network information such as source IP addresses, source port. This source information is stored into a AAA subscriber table. Secondly, information is gathered about the destination, such as the destination IP addresses, destination port, to determine what type of authentication is needed to access particular services. Third the packet is interrogated to receive information such as the protocol type, port or the packet type to determine what type of authentication is required for a packet to be authorized for network access. Once this information is gathered, a matching of the authentication requirements versus the authorization is applied. If there is a match, the packet is forwarded and allowed access. If this match fails, the subscriber information for that packet is set as pending for authorization. Pending for authorization packets require further authentication and authorization before being allowed to access the system. Authorization can be determined based upon the attributes determined by the packet, or if not matched, the user will have to provide authentication, which can be described in the HPR patent, U.S. Pat. No. 6,636,894, issued Oct. 21, 2003, filed Dec. 8, 1999, entitled "Systems and Methods For Redirecting Users Having Transparent Computer Access To A Network Using A Gateway Device Having Redirection Capability," in the name of inventor Short et al. The '894 Short patent is herein incorporated by reference.

For example, once the gateway device identifies the location from which access is requested, such as from a specific port of a hotel room, the gateway device can then determine the access rights of the user at that specific location. It should be appreciated that as an alternative to location-based identification the gateway device may identify a user or a user's computer based upon attributes other than location. For example, the gateway device may receive a MAC address identifying a particular user's computer (for example, a user in communication with the gateway device through a conventional modem), as is well known in the art, although the embodiments described herein will refer primarily to location-based identification as described above. Additionally, a user can be identified by the gateway device based upon a user ID and password which the user can input in response to a query for such information. This is discussed below and in U.S. Pat. No. 6,636,894, issued Oct. 21, 2003, in the name of inventor Short et al., entitled "Systems and Methods For Redirecting Users Having Transparent Computer Access To A Network Using A Gateway Device Having Redirection Capability", filed concurrently with this application and incorporated herein by reference. In addition, a user staying in a particular hotel room may be authorized access based upon the user's location. Alternatively, the user can be authorized access to the network and online services based upon the user's identification, or the user's computer, regardless where the user is obtaining access. Furthermore, access may be associated with a combination of attributes. For example, a user may be authorized access to a network where the user has input the user's identification and has accessed the network from a particular room. Such a requirement could prevent unauthorized users also staying in a particular room from obtaining network access.

Regardless of the means in which access is obtained and an attribute associated with the user is identified, access rights of users are determined according to an AAA method implemented by a AAA server. According to one embodiment of the present invention, the AAA server is located entirely within the gateway device. Alternatively, the AAA server can also be located external to the gateway device.

One function of the AAA server is to identify the user in communication with the gateway device in a manner that is transparent to the user. That is, the user will not be required to reconfigure the computer or otherwise change the home network settings, and no additional configuration software will have to be added to the computer. After a packet is received by the gateway device, as described in detail above, information contained within the packet is stored within a subscription table. The subscription table is a database of user information. In particular, the subscription table can maintain any information or attribute known about a user, including a circuit ID or MAC address, such that a particular user or user location can be identified upon accessing the computer system. After a packet is received, and attributes associated with a user are obtained, information corresponding to the packet is received from the subscription table. It will be appreciated by those of skill in the art that the packet may identify the location of the port from which access is obtained based upon location-based authorization, as described above, or a specific computer based upon a MAC address, as is well known in the art.

Regardless of connection means however, any attribute or anything known about the user or location of the traffic, can be stored in the subscriber table. The subscription table and information stored therein may be stored in a computer readable storage medium, as well known in the art, that is either disposed within the gateway device or external.

After receiving a request for access from a user and identifying the user or location through the use of the subscription table, the AAA server then determines the access rights of the particular user. What is done with the user depends upon information contained in the user's profile. Profiles of all users (i.e., identified by MAC address or by location or by some other attribute) are stored in a user profile database, which may be located internal to or external to the gateway device. It will be appreciated by those of skill in the art that although the user profile database is discussed herein as being separate and distinct from the subscription table, the two databases may be combined into one database containing both user subscription data as well as user profile data.

The user's profile can contain information that is based upon the user or the user's location (as established by location-based identification), and generally includes information concerning the access rights of a user or location. For example, the user profile database may establish that a user with a given MAC address has purchased access, or that a given circuit ID has free access or unlimited access. Guests in a particular room or rooms of a hotel, for example, suites and penthouses, may receive free unlimited internet access. Therefore, access rights can be available contingent upon the user's location (e.g., room) or location status (e.g., suite). In this event, no further identification is required, as the location from which the users are requesting access is known to the gateway device and stored in the subscription table.

In addition to storing whether users have valid access rights, the user profile database can also include specialized access information particular to a specific location or user, such as the bandwidth of the user's access, or a homepage to which a user should be directed. For example, a user accessing the network from a penthouse may receive a higher access band rate than someone accessing the destination network from a typical hotel room. Additionally, a user profile can include historical data relating to a user's access to the network, including the amount of time a user has accessed the network. Such historical information can be used to determine any fees which may be charged to the user, or due from the user, for access. Specialized access information contained within the user profile may be established by the system administrator, or by the user who has purchased or otherwise established access to the network. For example, where a user is transparently accessing the gateway device from a hotel room, the hotel network administrator may enter user access information into the profile database based upon access rights associated with a room in the hotel. This can also be done automatically by the gateway device or a local management system, such as a hotel property management system, when the user checks into his or her room. Additionally, the user may establish the information to be contained within the profile database upon first accessing the gateway device, as will be described in detail below. For instance, a new user may be directed to enter their credit card number to obtain access to the system. Whereas the subscription table initially identifies the user and maintains location information, the user profile database includes information concerning the details of the user's access privileges, as well as any specialized information for each user.

As noted above, user profile database can be maintained within the gateway device, or it can be located external to the gateway device. For example, where a hotel wishes to establish transparent network access for customers from hotel rooms, the hotel may maintain the profile database locally within the gateway device. Alternatively, if external to the gateway device, the profile database can contain the same information and be accessed by the gateway device to ascertain user's access rights. According to one embodiment of the invention, the profile database can be maintained outside of the gateway device by an internet service provider.

Upon receiving the location of a port or identity of a user transparently communicating with the gateway device, the AAA server compares the identification information contained within the packet to user profile information stored within the user profile database. This comparison may be accomplished using a computer having an operating system and software therein for comparing identification information in the received packet to records stored within the user profile database. Where users are not identified automatically based upon their location, the users may be required to identify themselves using a login and ID, so that their identification can be compared to user profiles stored within the user profile database. In an alternative embodiment of the present invention, the AAA server could query the user's computer, and more specifically, the user's browser, to obtain identification information stored therein so that the AAA server does not have to query a user for user information, thereby further making the AAA process of the present invention transparent to the user.

The user profile database may comprise programmable storage means located on a conventional personal computer, mainframe computer, or another suitable storage device known in the art. Additionally, the means for comparing the received data to the data within the database can comprise any software, such as an executable software program, which can compare data. For example, the AAA server may store user profiles on a hard drive of a personal computer, and the means for comparing the received user data to the user profiles resident on the computer can include computer software, such as Microsoft Excel (Microsoft Excel is a trademark of Microsoft Corporation, Redmond, Wash.). According to another embodiment of the invention, the AAA server can comprise a remote authentication dial-in user service (RADIUS), which is a well known authentication and accounting system used by a number of network service providers (NSPs).

Once a user's profile has been determined by access to the user's profile in the user database, three possible actions can result. Specifically, once a user's profile has been retrieved the AAA server may determine a user to have access, to be pending or in progress, or to not have access.

First, a user is deemed valid (i.e., to have access) where the user's profile in the user profile database states so. If a user is determined to be valid, the user's traffic can be allowed to proceed out of the gateway device from the portal page to the networks or online services the user wishes to access, or the user may be redirected to a portal page, typically, a more user-specific portal page, as described in U.S. Pat. No. 6,636,894, issued Oct. 21, 2003, in the name of inventor Short et al., entitled "Systems and Methods For Redirecting Users Having Transparent Computer Access To A Network Using A Gateway Device Having Redirection Capability, (hereinafter "Redirecting Application") filed concurrently herewith, prior to being allowed access to the destination network. For example, a user may be automatically forwarded to a user-input destination address, such as an Internet address, for example, where a user has free access associated with the user's hotel room. Alternatively, this may occur where the user has already purchased access and the user has not exhausted available access time.

If the second scenario occurs, in which the user is deemed pending or "in progress", the user may take steps to become authenticated so that the user's information may be recorded in the user profile database and the user is deemed valid. For example, a user may have to enter into a purchase agreement, requiring the user to enter a credit card number. If the user needs to purchase access, or if the system needs additional information about the user, the user can be redirected from the portal page via Home Page Redirect (HPR) and Stack Address Translation (SAT) to a location, such as a login page, established to validate new users. SAT and HPR can intervene to direct the user to a web server (external or internal) where the user has to login and identify themselves. This process is described in detail below and in more detail in the Redirecting Application.

According to one illustrative example, a user profile database is maintained by an ISP which may be associated with the computer network for providing internet service to those users on the network. Although unlimited access could be granted to users based on their location or MAC address, access may also be limited based on the access for which a user has paid. For example, the user profile database may route a user to a login page, where the user must enter user data, such as a user id and password. In this embodiment, a network access server (NAS) 28, located within the gateway device 12, can receive user data. Upon receiving user data representing the identity of a user attempting to access the network, a primary function of the NAS 28 is to grant or deny the user access to the network.

Although the NAS 28 grants and denies access to users, the NAS 28 does not determine whether each user is allowed to connect to the network and, if so, what type of connection should be established. Rather, these determinations are made by the AAA server 30, illustrated as exterior to the gateway device in FIG. 6, and described in detail above. Upon receiving user data the NAS 28 can, if necessary, reconfigure the data such that the data will be in the proper format to be received by the AAA server 30. In addition to reconfiguring the user data, the NAS 28 can also encrypt the user data such that the user identity and password will be protected during transmission to the AAA server 30. After reconfiguration, and optionally, encryption, the NAS 28 transmits the data to the AAA server 30 with a query to request that the AAA server 30 authenticate the user.

The AAA server 30 stores user profiles corresponding to users authorized to access the network. The user profiles typically include user identifications, passwords, access authorization, billing, and other pertinent user information. The AAA server 30 compares stored user profiles with the user data received from the gateway device 12 to determine if the user should be granted access to the network. As such, the AAA server 30 generally comprises a database and data storage means. According to one embodiment of the invention, the AAA server 30 is maintained by an ISP. In this embodiment, the user profiles stored by the AAA server 30 establish those users that can obtain Internet access via the ISP network. The ISP edits user profiles within the AAA server 30 to reflect those users who may become authorized or unauthorized to access the network.

Continuing with the illustrative example, the ISP may only register user profiles in the authentication database after users have been identified by the ISP and necessary billing information, such as addresses and credit card numbers, have been submitted. If the ISP has not posted a user profile in the AAA server 30 at the time of authentication, the user will not be permitted access to the network. If this occurs, the user may be asked to submit profile information to the ISP so that the ISP can add the user's profile to the AAA server 30. Furthermore, this may also be done the first time a user attempts to access the gateway device 12. The information may be entered by the user with the aid of webpage, a pop-up control panel or user interface, which can open when the user initially connects to the gateway device 12, as effectuated by HPR and SAT. As will be discussed below, the gateway device can request user information and forward it to the ISP such that the user does not know an ISP is receiving the information.

In the embodiment shown in FIG. 6, the AAA server 30 is located outside of the gateway device, although it may alternatively be located within the gateway device. For example, the location of the AAA server 30 may be such that the NAS 28 communicates with the AAA server 30 via internet protocol. Therefore, it will be appreciated that the AAA server 30 may be located at any internet address and stored on any computer accessible via internet protocol. Locating the AAA server 30 outside of the network can provide a number of advantages. First, the administrative burden on the network is alleviated because the network does not have to set up and maintain separate authentication databases on each network or gateway device. This is especially important because each gateway device 12 allows a finite number of users to access the network, so that multiple gateway devices may be required. Secondly, administering and maintaining one consolidated database of authentication data is easier than multiple smaller databases.

Referring again to the illustrative AAA example, after any requisite reconfiguration, the NAS 28 can transmit user data to the AAA server 30 with a query to request that the AAA server 30 authenticate the user. The AAA server 30 receives the user data and then compares the received user data to user profiles stored within its database. Where a customer is not identified by location, establishing access to the gateway device will typically involve a process in which a user must enter their identity and a password, and in some instances a desired billing scheme and service level as offered by the gateway administrator or network operator (information hereinafter collectively referred to as user data). Additionally, the user data can include information such as a user's social security number and a credit card number. As described briefly above and in more detail below, the gateway device can direct the user to a web page that requests desired data. However, where the customer is identified by location, the customer may only have to choose connection options, such as fixed fee or pay-per-use access, or a particular baud rate where the user can pay a premium for a higher speed connection, as the identity of the user may be known based upon location, and the user's payment information may already be known, such as where access is obtained via a port in a hotel room.

Assuming that a user has been deemed pending or "in progress," the gateway device typically presents users with a login page that enables new users to subscribe to the computer network so that they may subsequently obtain transparent access to networks or online services transparently through the gateway device. To direct the users to a login page the AAA server calls upon a HPR function. The HPR directs the user to the login page, and after the user has entered requisite information into the login page, the AAA server adds the new information to the customer profile database and can direct the user to the user's desired destination, such as an Internet address, or a portal page created by the network provider or users. Thus, new users can gain access to networks or online services without being predefined in the user profile database.

Because the gateway device is transparent to the user, the user communicates with the gateway device without the user's knowledge. This transparent communication results in a plug and play capability which enables a user to plug a computer into a port and directly access the internet or another online service without reconfiguring his or her computer from the home network settings resident on the computer and without requiring additional software to be loaded on the user computer. Therefore, the functions of the AAA server, and of HPR can be completely transparent to the user. For example, utilizing the system and method of the present invention, a user who has not purchased network access, and does not receive free network access, can plug into a port of the computer network and request connection to an Internet address through the user's Internet browser. After being directed to a portal page, the AAA server, unbeknownst to the user, identifies this user as pending (i.e., no information for that user has been identified in the user profile database), and calls upon the HPR function to send the user from the portal page to a login page which is different from the destination address initially entered by the user. Specifically, the HPR function as well as the SAT, discussed below, are performed by the AAA server and/or gateway device.

To achieve this redirection, HPR utilizes a SAT operation to direct the user from a portal page to a new destination at which a login page is presented, which is preferably local to the gateway device so that the redirection will be efficient and fast. This is accomplished by redirecting the user to a protocol stack using network and port address translation to the portal server that can be internal to the computer network or gateway device. More specifically, the AAA server receives the user's Hyper Text Transfer Protocol (HTTP) request for a web page and sends back the HTTP response reversing the network and port address translation the portal server, essentially acting as a transparent "go-between" to the user and new web server. It will be appreciated, however, that to receive the HTTP request the AAA server must initially open a Transmission Control Protocol (TCP) connection to the another server in line with the user-requested internet address.

After receiving the user's login information, the AAA server will create a user profile utilizing this information so that the user will be able to obtain immediate access to the network next time the user logs in without being required to enter login information again. The AAA server can create a profile for the user in a locally stored user profile database, as described above, or can update the user profile in a database external to the gateway device. Regardless of the location of the user profile, the next time the user attempts to login the user's profile will be located in the user profile database, the user's access rights determined, and the user allowed transparent access to networks or services.

According to one aspect of the invention, a user may be identified and authorized access to the network or online services based upon attributes associated with the user, such as the user's location or the user's computer. When this occurs, the user can be forwarded to a portal page unique to that user. As described below, and in the U.S. patent application Ser. No. 09/458,602, the user may be identified without being queried to input any identification information so that upon accessing the computer network the user is automatically directed to a generic portal page or a portal page established specifically for and unique to that user. According to another aspect of the invention, a user may be identified and authorized access based upon the user's identity after being redirected to the portal page. The user may have to enter a login name and password while at the portal page or after being directed to a login page so that the ISP or other entity maintaining the gateway device can identify the user. After entering identifying data, the user may be directed to a particular portal page, as in the first aspect described above. According to a third aspect of the invention, the user is not authorized access to the network. Where this occurs the user will be directed from the portal page to a login page where the user will have to input identification information, such as the user's name, address, credit card number, and other relevant data so that the user may be authorized to access the network. After the user enters sufficient login data to establish authorization, the user may be redirected to a portal page.

The redirection is accomplished by a Home Page Redirect (HPR) performed by the gateway device, a AAA server, or by a portal page redirect unit located internal to or external to the gateway device. To accomplish the redirection of a user to a portal page, HPR utilizes a Stack Address Translation (SAT) operation to direct the user to the portal page, which is preferably local to the gateway device so that the redirection will be efficient and fast. This is accomplished by redirecting the user to a protocol stack using network and port address translation to the portal server that can be internal to the computer network or gateway device. More specifically, the gateway device, AAA server or portal page redirect unit receives the user's HTTP request for a web page and sends back the HTTP response reversing the network and port address translation the portal server, essentially acting as a transparent "go-between" to the user and portal server. It will be appreciated, however, that to receive the HTTP request the gateway device, AAA server or portal page redirect unit must initially open a Transmission Control Protocol (TCP) connection to a server in line with the user-requested internet address.

According to one aspect of the present invention, when a user initially attempts to access a destination location, the gateway device, AAA server or portal page redirect unit receives this request and routes the traffic to a protocol stack on a temporary server, which can be local to the gateway device. This can occur where a user initially opens a web browser resident on the user's computer and attempts to access a destination address, such as an Internet site. The destination address can also include any address accessible via the network or an online service, and can include the portal page. The protocol stack can pretend to be the user-entered destination location long enough to complete a connection or "handshake." Thereafter, this protocol stack directs the user to the portal server, which can be local to the gateway device to facilitate higher speed communication. The redirection to the portal server can be accomplished by redirecting web pages only, rather than all traffic, including E-mails, FTPs, or any other traffic. Therefore, once authorized, if a user does not attempt to access a webpage through the user's internet browser, the gateway device can forward the communication transparently to the user's requested destination without requiring the user to access the portal page. Furthermore, according to one aspect of the invention specific user-input destination addresses may be authorized to pass through the gateway device without being redirected.

Assuming that a user has not been authorized access to the network based upon location based identification or user input identification, the user must provide the gateway device with sufficient information to become authorized access. Where the user is not authorized access the user is forwarded via HPR and SAT from the portal page to a login page. The login page enables new users to subscribe to the computer network so that they may subsequently obtain access to networks or online services transparently through the gateway device. To direct the users to a login page the AAA server calls upon the HPR function. The HPR directs the user to the login page, and after the user has entered requisite information into the login page, the AAA server adds the new information to the customer profile database and can direct the user to the user's desired destination, such as an Internet address or can return the user to a portal page, depending upon the design of the system. Thus, new users can gain access to networks or online services without being predefined in the user profile database.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of authorizing a portable communication device to access a network resource, the method being performed at a network management system in communication with the portable communication device via a network, the method comprising:
    receiving, from a portable communication device via a network, a request to access a network resource;
    determining, on a processor, whether the portable communication device is authorized to access the requested network resource, the determination being based on a unique identifying attribute associated with the portable communication device without the unique identifying attribute being predefined in a user profile database and without querying the portable communication device or its user for information;
    if the portable communication device is authorized, allowing the portable communication device to access the network resource; and
    if the portable communication device is not authorized, redirecting the portable communication device to an authentication system where the portable communication device is configured to submit authentication-related information wherein the portable communication device can be authorized to access the requested network resource, wherein redirecting the portable communication device comprises sending transmission control protocol handshake completion data to the portable communication device in response to the request to access the network resource, the transmission control protocol handshake completion data configured to appear to be from the network resource, wherein the network management system need not communicate with the network resource if the portable communication device is not authorized.

2. The method of claim 1, wherein the portable communication device is one or more of a laptop, handheld device, personal digital assistant (PDAs) and cellphone.

3. The method of claim 1, wherein the network is located in or forms part of one or more of an airport, hotel and cellular telephone network.

4. The method of claim 1, wherein determining whether the portable communication device is authorized to access the requested network resource does not require additional software to be installed on the portable communication device prior to connection with the network.

5. The method of claim 1, wherein the unique identifying attribute associated with the portable communication device is determined from packets received from the portable communication device.

6. The method of claim 1, wherein the unique identifying attribute uniquely indicates the portable communication device used by the user.

7. The method of claim 6, wherein the unique identifying attribute is the media access control (MAC) address of the portable communication device used by the user.

8. The method of claim 1, further comprising using location information to determine whether the portable communication device is authorized to access the requested network resource.

9. The method of claim 1, further comprising storing information about the portable communication device such that subsequent attempts to access the network do not require the user to establish authorization.

10. The method of claim 1, wherein authorization further comprises determining whether the user of the portable communication device has paid for access and authorizing access if it is determined that the user has paid.

11. The method of claim 1, further comprising using the unique identifying attribute to access information stored in a user profile database.

12. The method of claim 1, wherein the processor is included in a gateway device.

13. A computer implemented network management system configured to authorize a portable communication device to access a network resource, the system comprising:
    a first network interface configured to receive, from a portable communication device via a network, a request to access a network resource;
    a first software module that, when implemented on one or more processors, is configured to determine whether the portable communication device is authorized to access the requested network resource, the determination being based on a unique identifying attribute associated with the portable communication device without the unique identifying attribute being predefined in a user profile database and without querying the portable communication device or its user for information;
    a second software module that, when implemented on one or more processors, is configured to allow the portable communication device to access the requested network resource if the portable communication device is authorized;
    a third software module that, when implemented on one or more processors, is configured to redirect the portable communication device to an authentication system where the portable communication device is configured to submit authentication-related information wherein the portable communication device can be authorized to access the requested network resource if the portable communication device is not authorized, the third software module configured to redirect the portable communication device by sending connection handshake completion data to the portable communication device in response to the request to access the network resource, the connection handshake completion data configured to appear to be from the network resource, wherein the network management system need not communicate with the network resource if the portable communication device is not authorized; and
    one or more processors configured to implement the first, second and third software modules.

14. A computer implemented network management system configured to authorize a portable communication device to access a network resource, the system comprising:
- a first network interface configured to receive, from a portable communication device via a network, a request to access a network resource; and
- one or more processors configured to:
  - determine whether the portable communication device is authorized to access the requested network resource, the determination being based on a unique identifying attribute associated with the portable communication device without the unique identifying attribute being predefined in a user profile database and without querying the portable communication device or its user for information;
  - allow the portable communication device to access the requested network resource if the portable communication device is authorized; and
  - redirect the portable communication device to an authentication system where the portable communication device is configured to submit authentication-related information wherein the portable communication device can be authorized to access the requested network resource if the portable communication device is not authorized, by at least sending connection handshake completion data to the portable communication device in response to the request to access the network resource, the connection handshake completion data configured to appear to be from the network resource, wherein the network management system need not communicate with the network resource if the portable communication device is not authorized.

15. The method of claim 1, wherein the authentication-related information is related to an agreement to access the network resource.

16. The network management system of claim 13, wherein the authentication-related information is related to an agreement to access the network resource.

17. The network management system of claim 13, wherein the unique identifying attribute associated with the portable communication device is determined from packets received from the portable communication device.

18. The network management system of claim 13, further comprising a fourth software module that, when implemented on one or more processors, is configured to use location information to determine whether the portable communication device is authorized to access the requested network resource.

19. The network management system of claim 14, wherein the authentication-related information is related to an agreement to access the network resource.

20. The network management system of claim 14, wherein the unique identifying attribute associated with the portable communication device is determined from packets received from the portable communication device.

* * * * *